United States Patent
Cunningham et al.

(10) Patent No.: US 8,201,811 B2
(45) Date of Patent: Jun. 19, 2012

(54) MICROBUBBLE THERAPY METHOD AND GENERATING APPARATUS

(75) Inventors: Jeffrey L. Cunningham, Cabot, AR (US); Eric Jackson, Conway, AR (US); Remo C. Jacuzzi, Little Rock, AR (US)

(73) Assignee: Jason International, Inc., North Little Rock, AR (US)

( * ) Notice: Subject to any disclaimer, the term of this patent is extended or adjusted under 35 U.S.C. 154(b) by 595 days.

(21) Appl. No.: 12/352,171

(22) Filed: Jan. 12, 2009

(65) Prior Publication Data

US 2010/0179461 A1 Jul. 15, 2010

(51) Int. Cl.
*B01F 3/04* (2006.01)
(52) U.S. Cl. ......... 261/29; 261/121.1; 261/124; 4/541.4
(58) Field of Classification Search .......... 261/141, 261/29, 36.1, 37, 121.1, 123, 124, DIG. 75; 4/492, 541.4
See application file for complete search history.

(56) References Cited

U.S. PATENT DOCUMENTS

| | | | |
|---|---|---|---|
| 4,460,519 A | 7/1984 | Leggett | |
| 4,556,523 A | 12/1985 | Lecoffre et al. | |
| 4,639,340 A * | 1/1987 | Garrett | 261/36.1 |
| 4,907,305 A * | 3/1990 | Teramachi et al. | 4/541.4 |
| 4,979,245 A * | 12/1990 | Gandini | 4/541.4 |
| 5,086,620 A | 2/1992 | Spears | |
| 5,207,499 A * | 5/1993 | Vajda et al. | 362/96 |
| 5,215,680 A | 6/1993 | D'Arrigo | |
| 5,291,621 A * | 3/1994 | Mathis | 4/541.4 |
| 5,514,267 A * | 5/1996 | Machiya et al. | 210/170.06 |
| 5,770,062 A | 6/1998 | Isbell | |
| 5,797,874 A | 8/1998 | Spears | |
| 5,920,925 A * | 7/1999 | Dongo | 4/541.6 |
| 5,961,895 A | 10/1999 | Sanford | |
| 5,983,417 A * | 11/1999 | Perdreau et al. | 4/541.6 |
| 6,221,260 B1 | 4/2001 | Chahine et al. | |
| 6,293,529 B1 | 9/2001 | Chang et al. | |
| 6,315,942 B1 | 11/2001 | Spears et al. | |
| 6,454,997 B1 | 9/2002 | Divino, Jr. et al. | |
| 6,708,961 B2 * | 3/2004 | Ferber et al. | 261/122.1 |

(Continued)

FOREIGN PATENT DOCUMENTS

JP 1992295363 10/1992

(Continued)

OTHER PUBLICATIONS

European Search Report for corresponding Application No. 10000168.4-2318 dated Aug. 3, 2010.

(Continued)

*Primary Examiner* — Charles Bushey
(74) *Attorney, Agent, or Firm* — Banner & Witcoff, Ltd.

(57) ABSTRACT

A micro bubble generating system includes a shell having a well for retaining a first liquid to immerse an object. A micro bubble apparatus is provide to the shell for providing a pressurized mixture of a second liquid and a dissolved gas into the well so as to create a plurality of micro bubbles within the first liquid for engaging the object. One method of using micro bubbles includes providing a fluid mixture, including a saturated gas, to a fluid chamber connected a fitting; and producing a plurality of micro bubbles into a fluid. Another method of using micro bubbles includes providing a fluid mixture, including a saturated gas, into an air entrapment chamber; and producing a plurality of micro bubbles into a fluid.

11 Claims, 25 Drawing Sheets

U.S. PATENT DOCUMENTS

| | | |
|---|---|---|
| 6,725,882 B1 | 4/2004 | Shia et al. |
| 6,892,968 B1 | 5/2005 | Rindt et al. |
| 7,159,854 B2 * | 1/2007 | Lee et al. .................. 261/28 |
| 7,255,332 B2 | 8/2007 | Osborn et al. |
| 2001/0024638 A1 | 9/2001 | Schneider et al. |
| 2002/0028179 A1 | 3/2002 | Schutt et al. |
| 2005/0192556 A1 | 9/2005 | Soltani et al. |
| 2005/0260189 A1 | 11/2005 | Klibanov et al. |
| 2006/0054205 A1 | 3/2006 | Yabe et al. |
| 2007/0062869 A1 | 3/2007 | Yamasaki et al. |
| 2007/0095937 A1 | 5/2007 | Noguchi et al. |
| 2007/0108640 A1 | 5/2007 | Takahashi et al. |
| 2007/0161902 A1 | 7/2007 | Dan |
| 2007/0257381 A1 * | 11/2007 | Chuang .................. 261/76 |
| 2007/0295657 A1 * | 12/2007 | Kumano .................. 210/257.2 |
| 2008/0189847 A1 | 8/2008 | Yamasaki et al. |

FOREIGN PATENT DOCUMENTS

| | | |
|---|---|---|
| JP | 2002330885 | 11/2002 |
| JP | 2005034624 | 2/2005 |
| JP | 2006320675 | 11/2006 |
| JP | 2007127345 | 5/2007 |
| JP | 2007170250 | 7/2007 |
| JP | 2008-132037 | 6/2008 |
| JP | 2008-161832 | 7/2008 |
| JP | 2008-290050 | 12/2008 |
| WO | 2007051260 | 5/2007 |

OTHER PUBLICATIONS (Donald Yuhas et al.) "Enhancement of Ultrasonic Absorption by Microbubbles for Therapeutic Application", 2001 IEEE Ultrasonics Symposium, vol. 2, ISSN: 1051-0117, 2001.

* cited by examiner

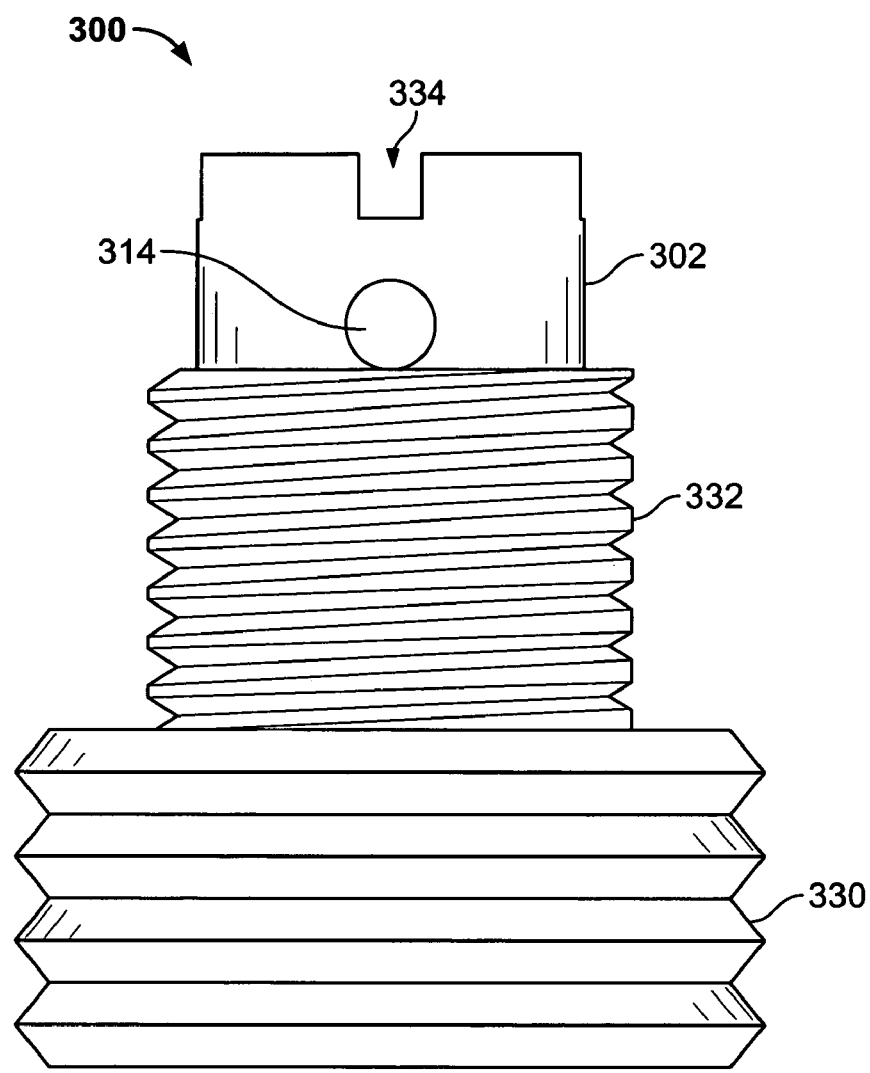
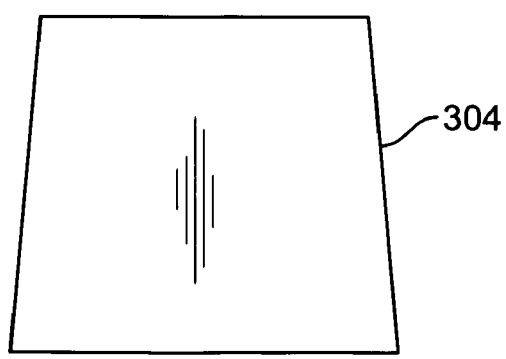
FIG. 4

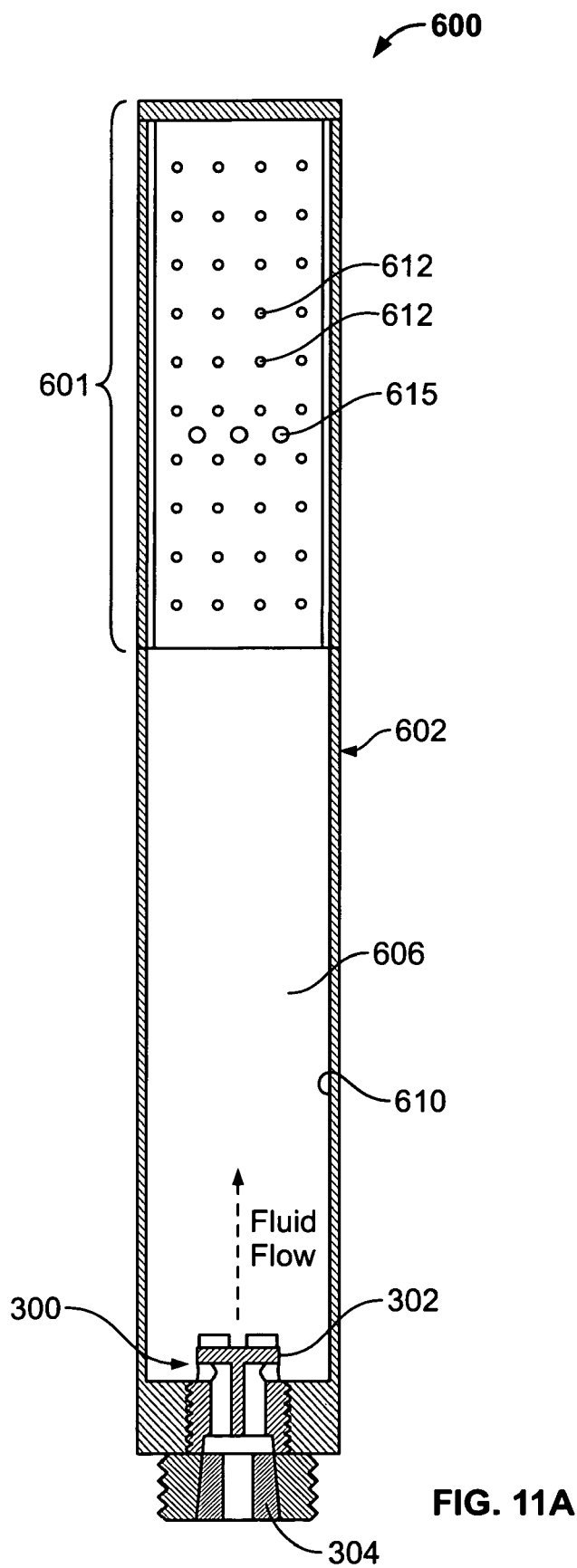
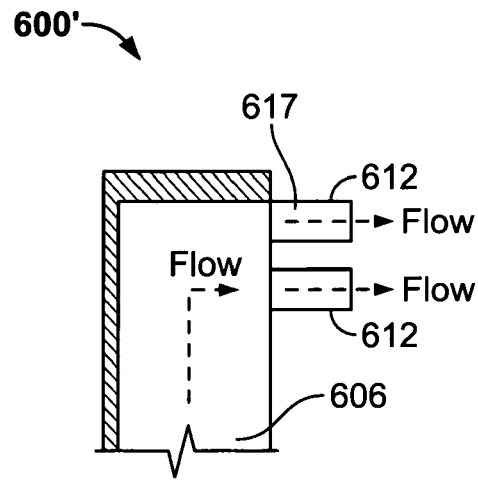
FIG. 11B
FIG. 11A

MICROBUBBLE THERAPY METHOD AND GENERATING APPARATUS

BACKGROUND

The technology pertains generally to a bubble generating apparatus, in particular a method and apparatus for micro bubble generation and therapy.

The old devices for bubble generating apparatuses that produce micro bubbles have drawbacks which do not allow for the efficient and practical use. One known method for producing micro bubbles is to procure electrolysis between two electrodes in the liquid, the micro bubbles being formed by a gas released by the electrolysis and appearing on one of the electrodes. This process is costly when a large number of micro bubbles is to be generated. The design characteristics preclude it from being used with fluid dispensing fittings because the physical size and configuration would not be practical.

In U.S. Pat. No. 6,293,529 and U.S. Pat. No. 4,556,523, the micro bubbles could not practically or efficiently be used with typical fluid dispensing fittings such as hydrotherapy jets, shower heads, and liquid nozzles.

In patent US2007/0108640, the design incorporates small orifices and or screens that the pressurized liquid and gas must travel through. This is a drawback because debris or other contaminates that are present in the liquid will eventually clog these small orifices. This would require expensive prefiltering of the liquid prior to reaching the small orifices and screens or repeated and continuous cleaning of the micro bubble producing screens would be required to maintain a properly operating micro bubble generating apparatus. This is not practical since it would be an unnecessary burden on the end user. The clogging of the small orifices and screens may also be detrimental to the system employing the bubble generating apparatus. The blockage could cause excessive back pressure resulting in premature wear on the systems components.

BRIEF SUMMARY OF THE INVENTION

Aspects of the present invention pertain to a micro bubble generating system and methods of micro bubble therapy.

In one aspect, a system includes a shell having a well for retaining a first liquid to immerse an object. A micro bubble apparatus is be attached to the shell for providing a pressurized mixture of a second liquid and a dissolved gas into the well so as to create a plurality of micro bubbles within the first liquid for engaging the object.

In one aspect, a liquid therapy system for a human body includes a shell having a well for retaining a first liquid to immerse a human body. A micro bubble apparatus may be attached to the shell for providing a pressurized mixture of a second liquid and a dissolved gas into the well so as to create a micro bubble cloud within the first liquid.

In one aspect, a therapy system includes a shell having a well for retaining a first liquid; and a means for providing a pressurized mixture of a second liquid and a dissolved gas into the well so as to create a micro bubble cloud within the first liquid for engaging a human body.

In an aspect, a micro bubble cartridge is provided that can replaceable in a hydrotherapy jet, shower head, or a liquid nozzle.

In another aspect, a therapy system includes a micro bubble apparatus and chromatherapy system.

In yet another aspect, a micro bubble generating apparatus comprises a housing body having a first fluid passage for increase a velocity of a pressurized mixture of a liquid and a dissolved gas in a direction towards a fluid flow. An orifice member may be releasably engaged with the housing body. The orifice member may include a second fluid passage being disposed at an angle with respect to the first fluid passage for generating a plurality of micro bubbles from the mixture. An opening in the housing body is provided for releasing the plurality of micro bubbles.

In another aspect, a micro bubble generating apparatus comprises a first fluid passage having a progressively larger height to width ratio in a direction towards a fluid flow. A second fluid passage may be disposed at an angle with respect to the first fluid passage for generating a plurality of micro bubbles; and an opening for releasing the plurality of micro bubbles downstream of the first and second fluid passages.

In yet another aspect, a shower apparatus comprises a head having a plurality of projections for mechanically engaging a surface, and an orifice therein to release micro bubbles; and a micro bubble component having a construction for fluid communication with the orifice.

In yet another aspect, a shower apparatus comprises a head having a plurality of projections for mechanically engaging a surface, and at least one of the projections includes a lumen with a distal opening to release micro bubbles; and a micro bubble component having a construction for fluid communication with the lumen.

In one aspect, there is provided a method of micro bubble therapy that comprises providing a fluid mixture, including a saturated gas, into a fluid chamber; and producing a plurality of micro bubbles into a fluid.

In one aspect, there is provided a method of micro bubble therapy that comprises providing a fluid mixture, including a saturated gas, into an air entrapment chamber; and producing a plurality of micro bubbles into a fluid.

In another aspect the methods of micro bubble therapy may include a step of providing air bubbles larger than the micro bubbles. In yet another aspect, the methods of micro bubble therapy may include a step of providing illumination to the fluid to enhance the visual experience of a user and provide chromatherapic benefits. In another aspect, methods of micro bubble therapy may include a step of providing an aromatic gas, such as a scent, in the saturated gas used to create the micro bubbles. In another aspect, the micro bubble method includes sanitizing a fluid, such as water, in a bathtub well or liquid carrier well.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 4 is an exploded assembly view of a bubble generating apparatus.

FIG. 6 is a cross-sectional view of an alternative construction of a bubble generating apparatus.

FIG. 11A is a cross-sectional view of a hand held shower construction for generating micro bubbles.

FIG. 11B is a partial cross-sectional view of the head portion of hand held shower construction for generating micro bubbles.

DETAILED DESCRIPTION

Overview

Inventive aspects pertain to a bubble generating apparatus, such as an apparatus for micro bubble generation. It is understood that other embodiments may be utilized and structural and functional modifications may be made without departing from the scope of the present invention.

General

As used herein, the term "micro bubbles" are generally referred to as gas bubbles disposed within a liquid. One such liquid is water. A micro bubble generally measure approximately less than 100 microns or 0.004 inches in diameter as compared to a typical gas bubble in conventional whirlpool, air bath, or, air whirlpool bath that is approximately 0.060 inches to 0.125 inches in diameter.

The micro bubbles may comprise numerous gases, including but not limited to, oxygen, ambient air, or ozone or other therapeutic gases or scents/gases for use during hydrotherapy. The micro bubbles can remain suspended in water for an extended period of time. Gradually, the gas within the micro bubbles dissolves into the water and the bubbles disappear as they collapse within the water. In one aspect, during the collapse, the micro bubbles release free-radical oxygen ions, which are effective in neutralizing a variety of toxins. In one aspect, the micro bubbles are characterized by having negative electrical charges. The negative charge attracts dirt, debris and impurities as well as suspended floating particles very effectively. It is believe that during the collapse of the micro bubbles, thermal phenomena indicates that heat flux (energy) can be released in the surrounding fluid, such as water. Over a very short period of time, it is known that the thermal phenomena may create temperatures well above 212 degrees Fahrenheit. This phenomenon can help kill bacteria in the water and thus, sanitize the water. Hence, the end-user or object surfaces (e.g., surface area) in the micro bubble cloud receive an improved cleaning experience.

The microbubbles can also be used in conjunction with current fluid sanitizing devices such as ultraviolet (UV) light sanitizers. The microbubble refractive enhancement of the UV light improves the sanitizing properties and bactericidal effects of the device. This is achieved by improving the UV intensity, minimizing the fluid's UV exposure duration and better distribution of the UV light waves in the fluid.

In one aspect, the size of the micro bubble and the low-pressure gas it retains therein creates a small buoyancy force. This phenomenon that creates a lift that enables the bubbles rise in a liquid. This buoyancy force may be less than the surrounding surface tension of the water. In one aspect, the micro bubble does not rise to the surface, as a typical bubble produced in hydrotherapy baths but remains suspended in the water. The suspension in water enables gas, such as oxygen or ambient air, in the micro bubble to be available to dissolve in the surrounding water.

Illustrative Operating Environment

Figure 1A:
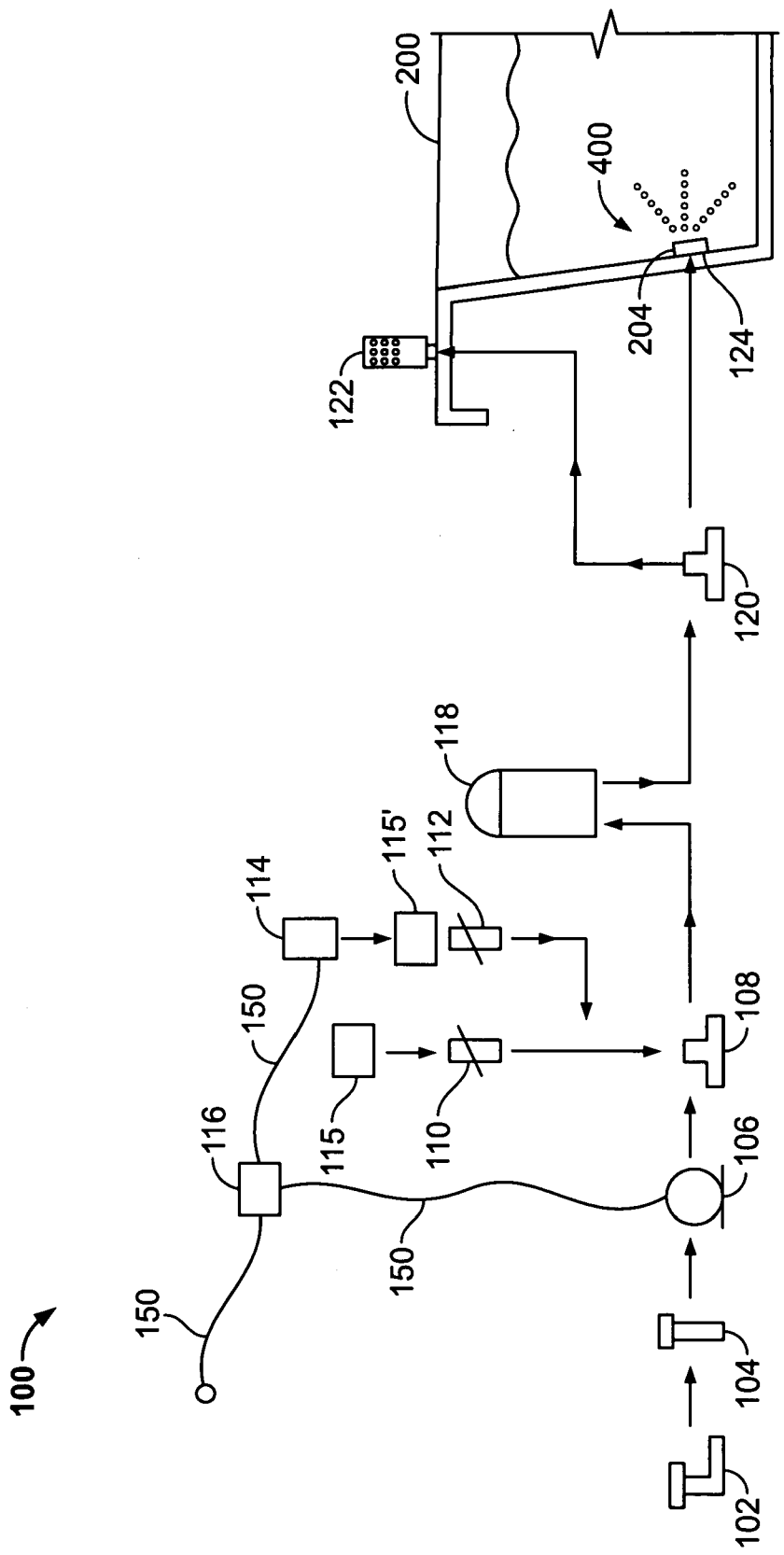
FIG. 1A is a functional block system diagram of a bubble generating system according to a construction using the inventive teachings.
Figure 1B:
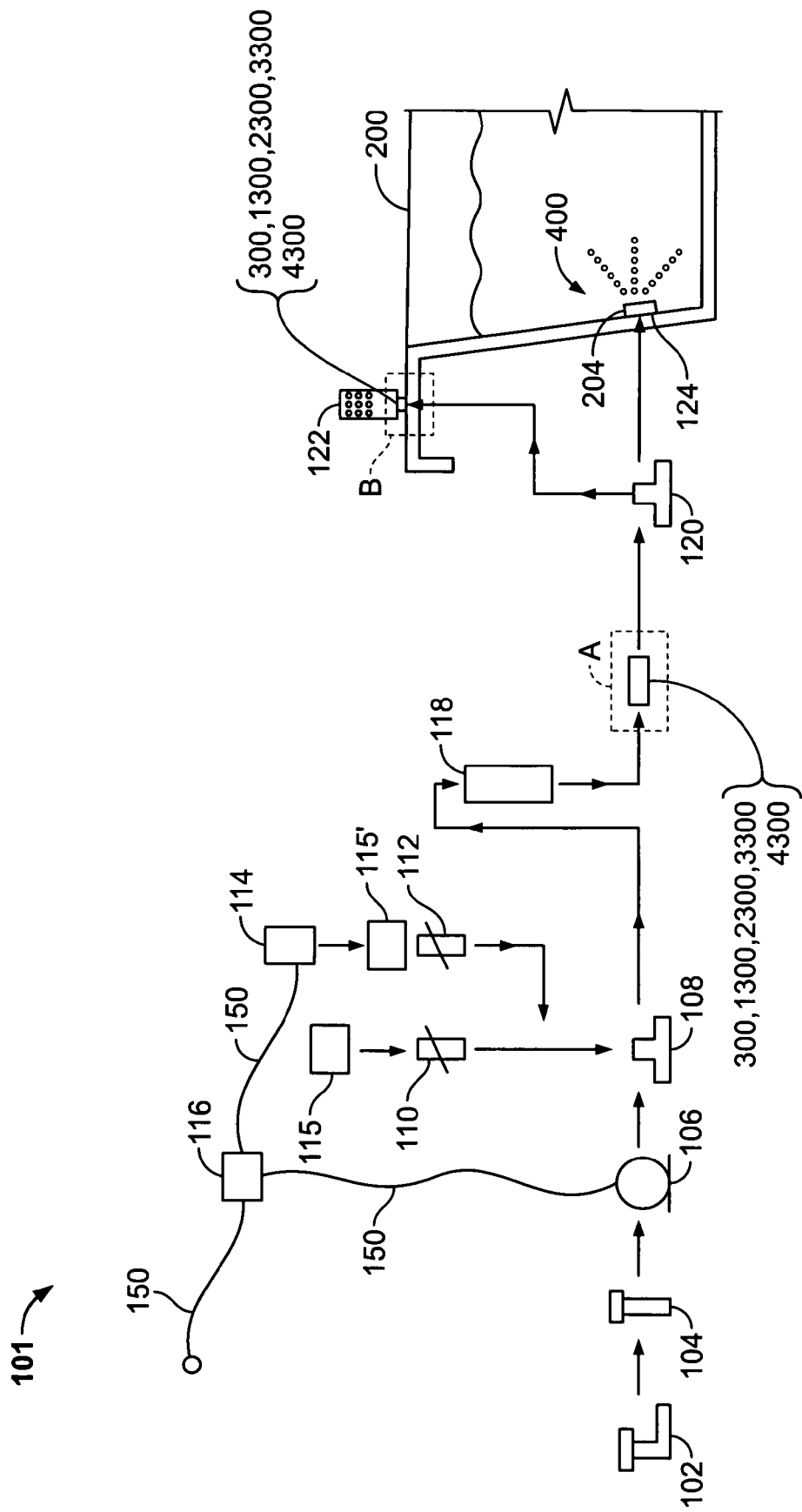
FIG. 1B is a functional block system diagram of an alternative bubble generating system with a micro bubble generating apparatus disposed at alternative locations in the interconnecting plumbing using the inventive teachings.

Various aspects of the present inventions may at least be described in the general context of an apparatus for the generation of micro bubbles. Accordingly, it may be helpful to briefly discuss the components and operation of an operating environment on which various aspects of the present inventions may be implemented. Accordingly, FIGS. 1A and 1B illustrate schematic diagrams of an illustrative system environment that may be used to implement various aspects of the present invention. In one construction, using the inventive teachings herein, a micro bubble hydrotherapy bathing system may be provided with a liquid carrier vessel, such as a bathtub. In one construction, an improved system may be achieved by using an apparatus for forming and distributing small (micro) bubbles within a liquid retained in a well of a bathtub or other liquid carrier vessel.

Aspects of the system environment 100, 101 provide a method of producing gas micro bubbles in a liquid. In one example, a liquid, such as water, is drawn from a reservoir or liquid source through a suction fitting affixed to the reservoir by way of a high-pressure pump. A gas is drawn through an injecting device using the venturi principle. In one manner, a differential of pressure is utilized in the device to create a vacuum. The drawn gas and liquid are then mixed in a pressure vessel under a positive pressure. A mixing nozzle located in the internal cavity of the pressure vessel may be used. This action causes the liquid to be saturated with the gas under pressure. The pressurized mixed liquid and dissolved gas is provided to a micro bubble jet in which micro bubbles are produced. The pressurized mixture of liquid and dissolved gas is then distributed into a second liquid contained in a bath well so as to create a micro bubble cloud within the second liquid. The second liquid can be water without the saturated gas.

Various aspects of the system environment 100, 101 provides for gas micro bubbles generation in a liquid, such as water. The system 100, 101 may comprise of a suction fitting 102 attached to the bathtub 200, and fluidly connected via interconnecting plumbing to the bath well, and optional filter 104 in fluid communication with a high-pressure circulation pump 106. In one construction, the suction fitting 102 can supply sufficient quantity water (e.g., gallons per minute) to any current type of hydrotherapy producing pump as well as the high pressure-circulating pump 106 for producing micro bubbles 400. In another construction, an optional filter 104 can be used in the plumbing line between the suction fitting 102 and the high-pressure circulating pump 106. The filter 104 assists in eliminating water borne debris that could obstruct the overall micro bubble generation system 100. In one construction, the filter 104 may also provide easy access by the end-user for periodic cleaning of the filter or replacement for maintenance.

Referring to FIGS. 1A and 1B, high-pressure circulating pump 106 is provided to generate a sufficient fluid flow and pressure to draw air through an injector and provide for a minimum system pressure to allow for the saturation of liquid with the gas. The high-pressure circulating pump 106 may be provided in numerous constructions and develop various head pressures. In one example, the pump 106 may develop pressures between 80 psi to 130 psi (pound per sq. inch). In one construction, the circulating pumps 106 may be compact, energy efficient and quiet. In other constructions, system 100 can employ a pump 114 to circulate other types of gasses into the pressurized liquid stream (e.g., pressurized water stream). Nevertheless, the other types of gasses that may be employed in the system 100 are ambient air, oxygen, and ozone or a combination of the gasses.

Figure 2A:
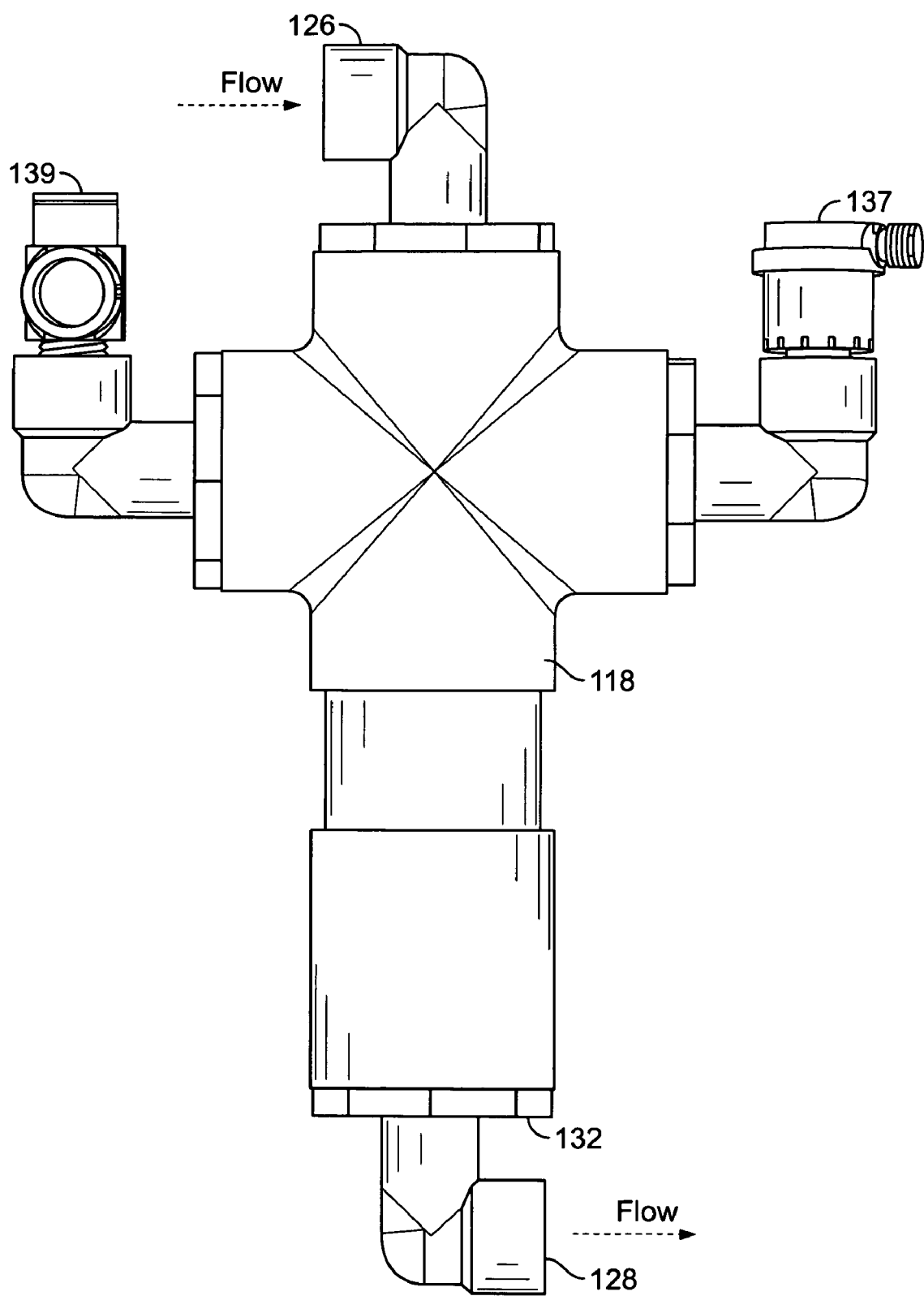
FIG. 2A is a schematic diagram of a pressure vessel construction.
Figure 2B:
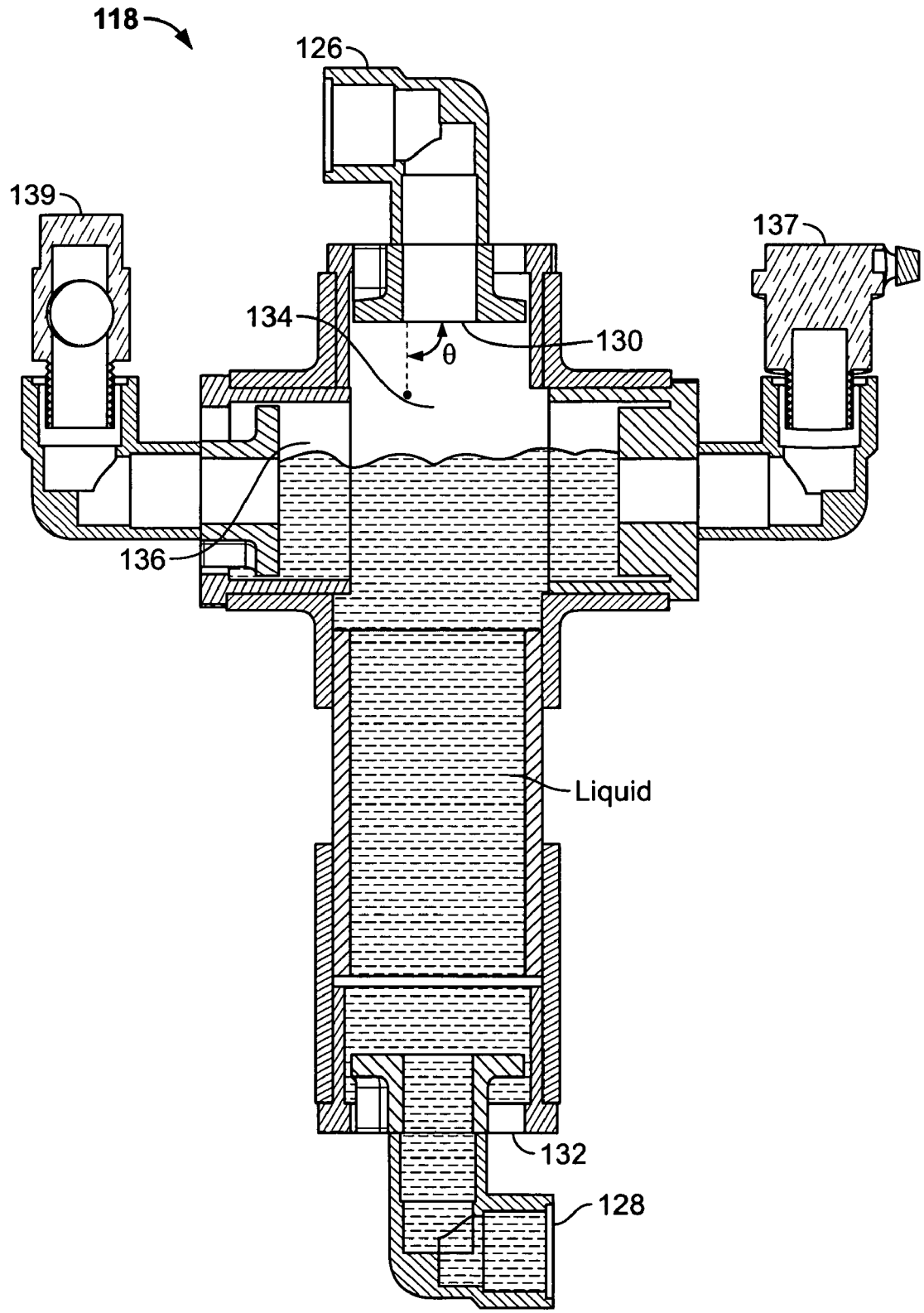
FIG. 2B is a cutaway schematic diagram of the pressure vessel construction shown in FIG. 2A.

With continued reference to FIGS. 1A and 2B, in one construction, the pump 106 discharges pressurized liquid into an injector 108. The check valve 110 could be used with injection 108. The injector 108, through a differential of inlet and outlet pressure, creates a vacuum that draws a gas (such as ambient air) into the pressurized liquid stream. An option to using ambient air is distributing gas into the injector 108 with a circulation pump 114 in combination with check valve 112.

In one construction, an aromatherapy dispenser 115, 115' may be employed with pump 114 or injector 108. The base gas (e.g., oxygen, ambient air, or ozone or other therapeutic gases) that is either drawn or pumped into the liquid can have a scent added thereto. The base gas is distributed through the aromatherapy dispenser 115, 115' which contains aroma producing materials, such as known conventional essential oils or scented beads that known to produce psychological and physical well-being benefits.

The end-user of the system 100, 101 may use an electronic controller 116 to control a circulation pump 114 and high-pressure circulation pump 106 via wiring 150. In one construction, the electronic controller may include a microprocessor configured to control the sequences of the actuation of the circulating pump 114 and high-pressure pump 106. The microprocessor can provide various controls to the individual connected pumps. The microprocessor may have a system memory with computer readable code in the form of read only memory (ROM) and random access memory (RAM). The memory stores programmable instructions of the operational logic sequences of the pumps that are executed by microprocessor. Controller may be connected to the pumps via a wired or may be a wireless communication type.

Mix Tank

With reference to FIGS. 1A, 1B and 2A-B, in operation, the mixed liquid and gas are in fluid communication with the saturation/mix tank 118. Saturation and mixing tank 118 is used to agitate and saturate the liquid in the tank with a gas. The saturation/mix tank may comprise a pressure vessel containing at least one inlet port 126 and one outlet port 128. In one construction, the inlet port 126 is positioned at the top of the tank 118 to promote mixing action of the gas and liquid. Nevertheless, the inlet port 126 may be disposed at other positions on the tank. The inlet port 126 may contain a nozzle 130 directed towards the internal void of the tank 118 so to agitate the liquid and gas. The nozzle 130 may be directed at a various angles in relation to the top and bottom of the tank. For example, the nozzle 130 may be disposed at angle 90 degrees as measured from the vertical. The nozzle 130 may have various orifice sizes, such as 0.125 inches to 1.000 inches. The pressurized fluids are distributed out of the tank via the outlet port 128 on the bottom of the tank 118. The outlet port 128 may be provided with various orifice sizes, such as 0.125 inches to 1.000 inches. In one construction, the tank 118 includes an outlet port 128 located in the lowest most portion 132 of the tank 118. In this way, the outlet port location in the tank 118 assures good drainage of the tank at the end of the operation cycle of the system 100.

With reference to FIG. 2B, in the pressure vessel 118, a gas headspace 134 is located above the liquid surface 136 to increase the liquid and gas saturation efficiency. The tank may be designed to allow a gas head 134 above the liquid to develop each time the tank is drained and filled. The gas head 134 may be regulated by a float valve 137. In one arrangement, the float valve 137 advantageously assures large gas bubbles do not mix with the liquid and gas while discharging the tank 118. A pressure relief valve 139 may also be disposed in tank 118 for safety precautions. The pressure relief valve enables excess pressure to be bypassed from the tank 118 into the intake plumbing for the circulation pump. If desired, the tank 118 may be disassembled for accessing the internal components.

With reference to FIGS. 2A and 2B, in one aspect, the saturation/mix tank 118 is plumbed in direct fluid communication with the injector 108 to minimize the elapsed time to create the micro bubbles and to minimize the overall plumbing space. These benefits may be accomplished by directing the flow of pressurized fluids at a predetermined angle down into the tank 118 with nozzle 130 of a predetermined orifice size connected to the inlet port 136. Various flow angles and orifice combinations are possible. For example, the flow angle (theta), as measured with respect to the horizontal, may range from 90 degrees to 180 degrees. The outlet 128 is provided in the form of an orifice. The orifice can be of different sizes and shapes, such as circular, rectangular, square or triangular. In one construction, the orifice has a circular shape. Various orifice sizes diameters or widths are possible and may range from 0.125 inches to 1.000 inches. Nevertheless, other diameters or widths are possible according to the inventive aspects. The flow angle/orifice combinations create an agitation action to mix the two fluids, such as air and water. During the mixing process, the dissolved gas levels (ambient air or other selected gas, such as oxygen) in the fluid (e.g., water) may be increased by a variety of methods. In one method, the combination of the gas head located above the fluids, the pressure in the tank and the fluid mix percentage enables an increase of the dissolved gas level in the fluid.

Figure 3:
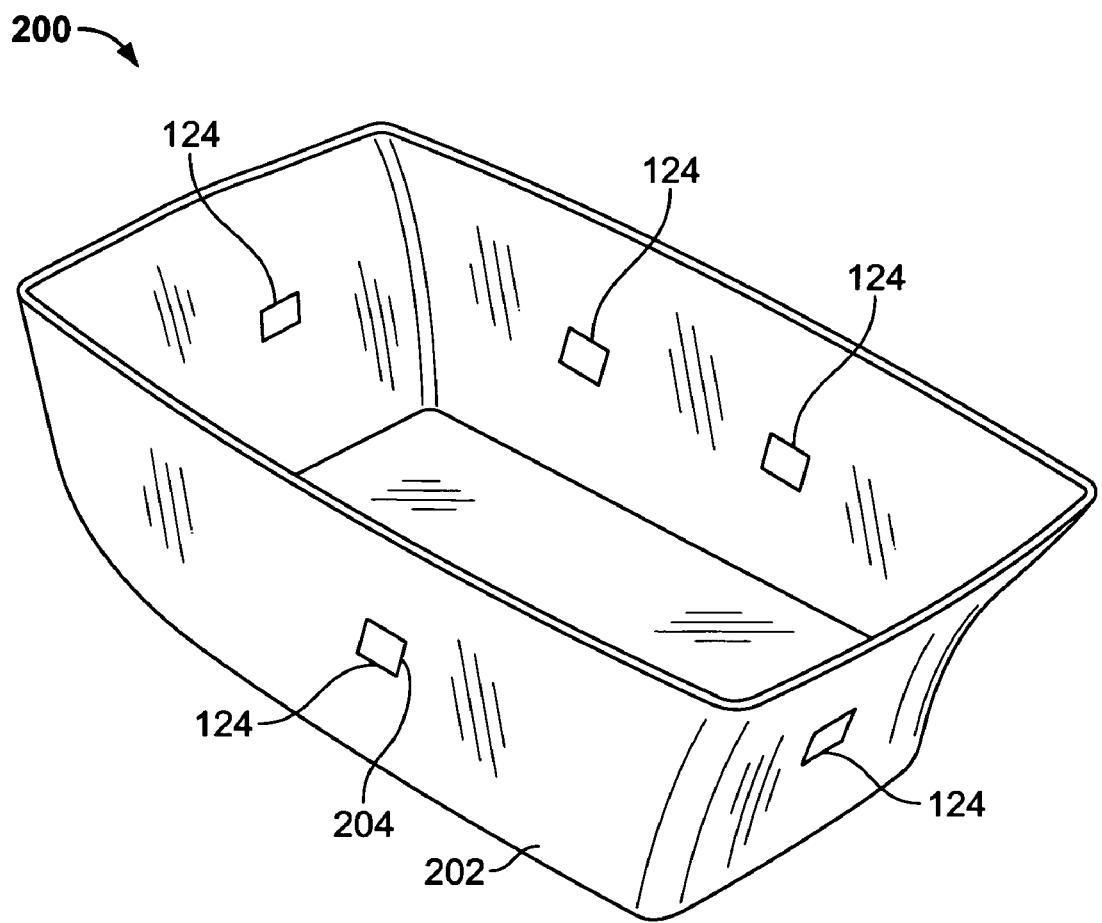
FIG. 3 is a schematic diagram of a bathtub construction.
Figure 5:
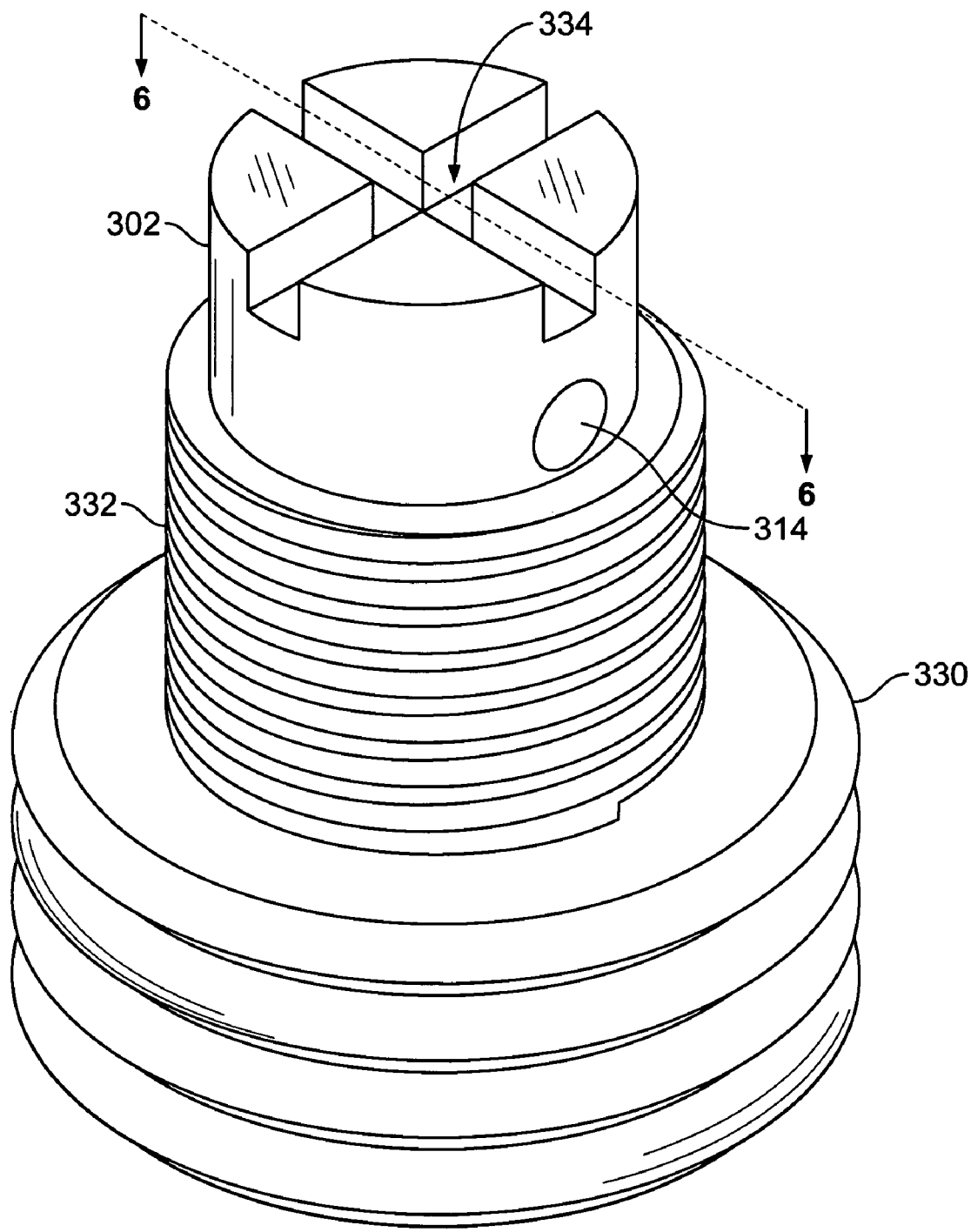
FIG. 5 is a perspective view of an assembled bubble generating apparatus shown in FIG. 4.

In one aspect, the homogenized (mixed) liquid and gas mixture exits the outlet port 128 of the mix tank 118, which is distributed under pressure to a micro bubble jet 124. Referring to FIGS. 1A and 3, a single or a plurality of micro bubble jets 124 may be attached to the shell 202 of the bathtub 200 through a hole or opening 204 in the sidewall or bottom of the shell 202 via bonding, or mating threading, for example In this way, the micro bubble jets 124 are fixedly attached to the bath shell 202. The micro bubble jet 124 may comprise decorative flange, a threaded through-the-wall fitting, a threaded body, and, with or without, a micro bubble formation component. The jet flange, threaded through-the-wall fitting, and threaded body are designed to be attached to the shell of the bath. The system 100, 101 may be designed to be inexpensive, compact in size.

The system 100, 101 constructions provide for one or more advantages. For example, though the use of the system 100, 101 to provide micro bubbles 400, a decrease in muscle tension, or increase body circulation or the opening skin pores of a human body can help release unhealthy toxins. Additionally, the micro bubble jets with the micro bubbles enables enhanced cleaning of the epidermal layer of a human body by surrounding the body with negatively charged micro bubbles small enough that they can enter the pores of the epidermis and remove the dirt and impurities. In yet another benefit, the micro bubbles oxygenate and soften the skin by increasing the dissolved oxygen levels in the water, kill bacteria with its negative ions, and reduce or eliminate the need for soaps and chemicals in the bath.

Figure 26:
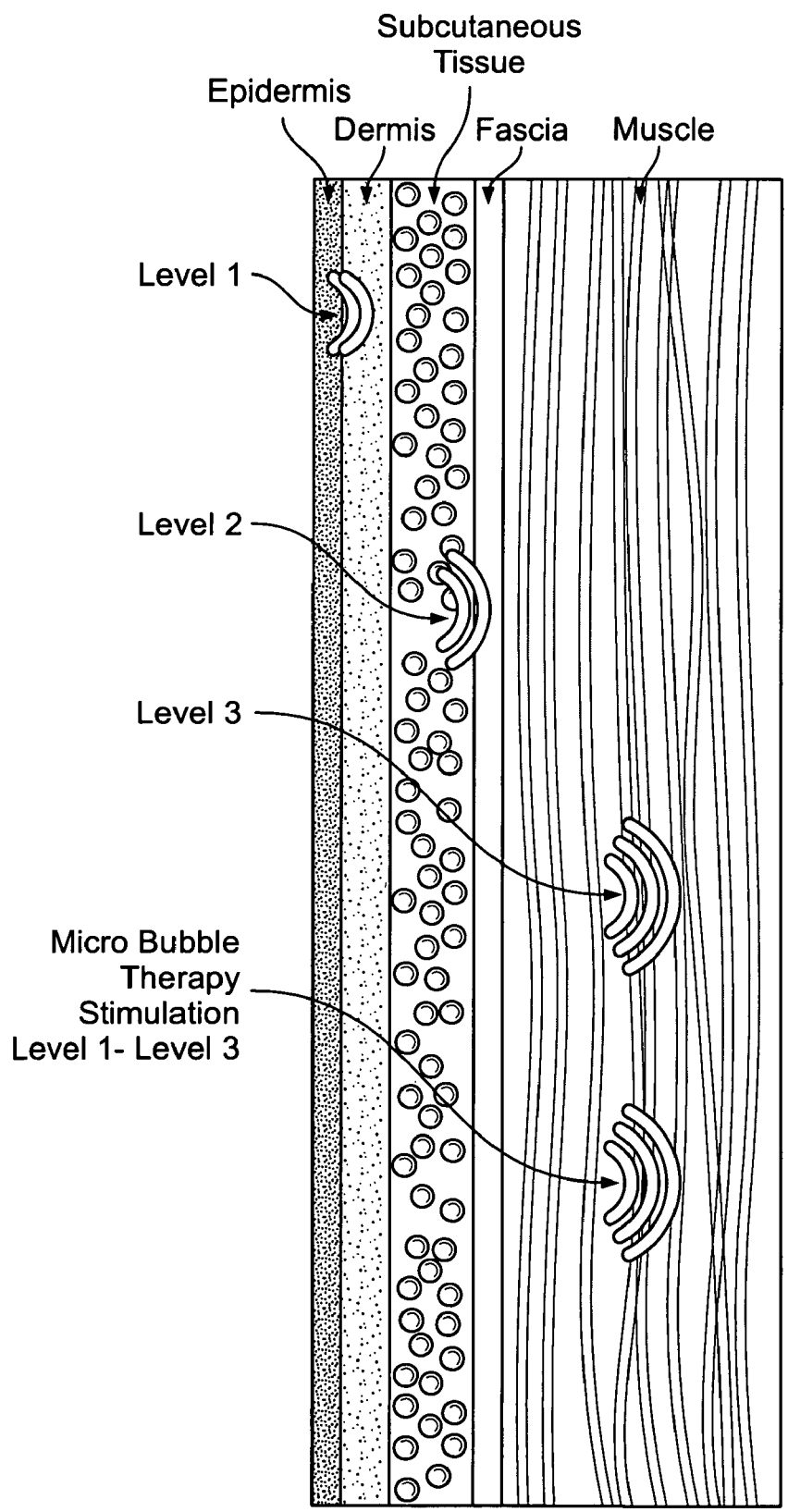
FIG. 26 is a schematic representation of the layers of skin of a human body for illustrative purposes.

Referring to FIG. 26, the soft connected tissue of a human body has layers—an epidermis, dermis, subcutaneous tissue, fascia and muscle. It was observed that the inventive micro bubble therapy system and method in a heated soaking format provides physiological benefits to the human body including hydrating the epidermis and dermis or making the skin feel softer. (Level 1 stimulation in FIG. 26) For example, the micro bubbles in the bath can provide more than 95% dissolved oxygen levels to the bath water, thus increasing the skin moisture levels and softness. One example of the heat soaking format could have water a temperature of 104 degrees F. Other physiological responses of the micro bubble therapy includes the stimulation the skin's temperature receptors, or the further opening of pores of the skin which helps to eliminate body toxins. Micro bubble therapy of a human body is believed to increase cardiac output by improving blood circulation and promoting relaxation. Micro bubbles detoxify the skin by being small enough to enter the pores and by increasing the skin temperature. The skin temperature increase is believed to be achieved through an exothermic action releasing heat energy caused by the collapsing of the micro bubbles near the epidermis of the human body. For example, the negative ions or anions produced from the micro bubbles in concentration levels more than 200,000 anions per cubic centimeter helps increases blood circulation, improves cardiac output, and promotes a deeper level of relaxation than provided by conventional soaking hydrotherapy.

It was observed that the inventive micro bubble therapy system and method enables the hot water temperature in the bathtub to be maintained for longer periods of time than without micro bubbles. This advantage is achieved because of the dense micro bubble cloud formed at the surface of the bath water. This dense layer of micro bubbles reduces the heat loss in the bath water caused by convection.

It was observed that the inventive micro bubble therapy system and method provides physiological benefits to the human body when the body is in the bath including stimulating the pressure receptors of the muscle and the surrounding fascia (Level 3 stimulation in FIG. 16) Hence, the micro bubble therapy promotes tissue flexibility further increasing circulation and the rejuvenation of the muscular tissue. Micro bubbles produce ultrasonic waves as the bubbles collapse which burst at speeds of 400 km/h. It is believed that ultrasonic wave massages deep into the fascia region and muscle tissue of the human body. This action enhances the stimulation of the pressure receptors to increase the therapeutic benefit of the micro bubble therapy to the user.

In another construction shown in FIGS. 1A and 1B, the homogenized liquid and gas mixture exits the mix tank 118 and is provided to a micro bubble hand shower 122 through the optional diverter valve 120. The fluids are circulated to the micro bubble jet 124 or the optional micro bubble hand shower 122.

Referring to FIG. 1B, the inventive aspects of can be practiced with a micro bubble generating apparatus 300, 1300, 2300, 3300, or 4300 in alternative locations (e.g., area A and B) upstream of the discharge fittings or within the discharge fitting. In one arrangement and referring to area A, the micro bubble generating apparatus may be provided between the saturation/mix tank 118 and diverted valve 120. Nevertheless, the micro bubble generating apparatus is provided upstream of the micro bubble jet 124. In one arrangement and referring to area B, the micro bubble generating apparatus may be provided upstream of the optional micro bubble hand shower 122.

The inventive system 100, 101 and method(s) enables cleaning the bath well and interconnecting plumbing with micro bubbles. In system 100, 101, the micro bubbles are allowed to enter the interconnecting plumbing of the bath through the jets 124, 1202 and 1102 and suction fitting 102. This is because the suction fitting 102 may draw the liquid mixture of micro bubbles and water in the bathwell for the next cycle to create micro bubbles. This operation may be performed each time the bath micro bubble system is turned on to use the cleansing characteristics of the micro bubbles. The ability to attach and lift contaminates of the micro bubbles will allow contaminates to float to the surface of the liquid in the bath well. The micro bubbles also have a germ killing ability caused by there negative ions. This will assist in maintaining a clean and sanitized bath.

Micro Bubble Cartridge/Apparatus

Referring to FIGS. 4 to 10, in one construction, a bubble generating apparatus 300 is used to create micro bubbles. The bubble diameters are approximately 100 micron (0.004 inches in diameter) or less. The bubble generating apparatus 300 receives fluid from a pressurized fluid source, such as the saturation/mix tank 118 (See FIGS. 1A and 1B). The bubble generating apparatus 300 comprises of a housing body 302 configured to mechanically receive/engage an orifice nozzle 304. The bubble generating apparatus 300 may be of a metal construction, (casted or machined) or could be a molded plastic construction. A liquid and gas mixture is distributed through an opening 306 in the orifice nozzle 304 into a series of passages/fluid pathway in the housing 302 oriented at various angles to each other, such as 90 degrees. The passages may be oriented in a generally perpendicular pattern to cause the gas bubbles in the liquid to be broken up into small micro bubbles and prevent bubble coalescence as the fluid impacts the wall bends of the passages in the housing. The micro bubble apparatus 300 can be installed into fittings that are used for directing the flow of fluids such as hydrotherapy jets, shower heads and/or liquid nozzles.

Referring to FIGS. 4 to 10, in one construction, a bubble generating apparatus 300 broadly comprises a housing 302, and a nozzle orifice 304 The housing 302 includes external threads 330, 332. The threads 330, 332 can of fine or course constructions depending on the intended use in another apparatus. While threads are shown, other types of fastening methods may be used with the scope of the inventive concepts herein, such as adhesive bonding. As can be seen, in the FIG. 5, the distal top of the housing 302 includes a recessed feature 334 to receive tools heads (e.g., flat head screwdriver) for installation and removal of housing 302, and nozzle orifice assembly 304 for another apparatus. As can be appreciated, the user can apply a torque force to the recessed feature 334 to rotate the housing 302 about its vertical axis to remove the housing or install the housing as desired.

Figure 6:
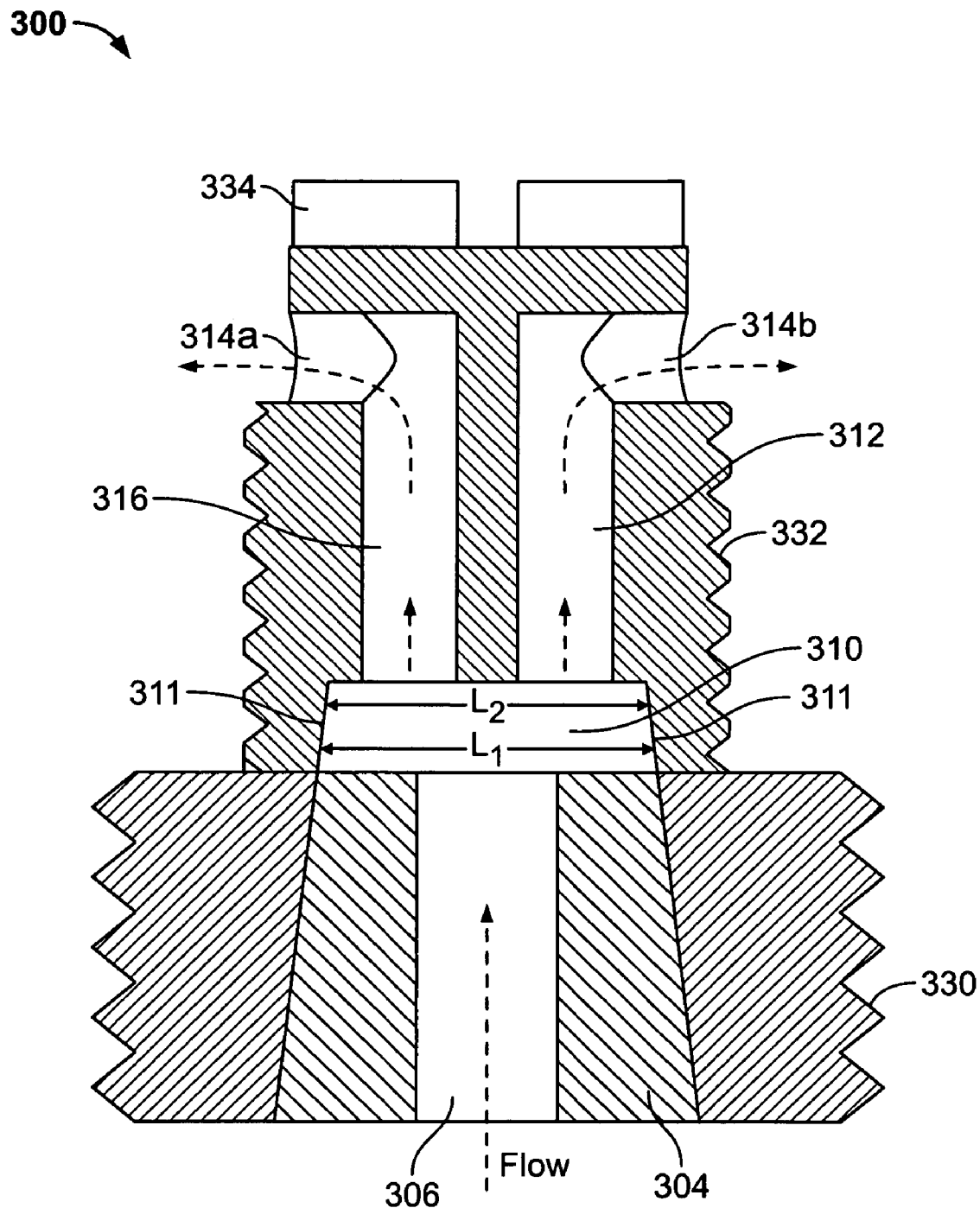
FIG. 6 is a cross-sectional view of the bubble generating apparatus shown in FIG. 5 taken along line 6-6.

Turning now to FIG. 6, nozzle orifice 304 generally comprises a tapered body and a fluid pathway 306. The fluid pathway 306 can be constructed of various diameters and lengths. The fluid pathway 306 can be of different sizes and shapes, such as tubular prismatic cylinder, or in cross-section, a rectangular, square or triangular shape. In one construction, the fluid pathway 306 has a cylindrical tube construction. Various sizes diameters or widths are possible and may range from 0.125 inches to 0.250 inches. Nevertheless, other diameters or widths are possible according to the inventive aspects. The length of the fluid pathway 306 is variable to the height of the nozzle orifice 304. The length can range from 0.125 inches to 0.625 inches, for example. As can be appreciated, the width of the fluid pathway and/or length can be varied to control the velocity and pressure of the fluid being distributed into the housing body 302. In one construction, the size the pathway 306 provides for proper back pressure, fluid velocity or a diameter large enough to prevent clogging from water borne debris or contaminates.

The housing 302 includes an intermediate chamber 310 and a plurality of internal fluid pathways 312, 314, and 316. Intermediate chamber 310 is provided at the outlet of the orifice nozzle 304 so as to receive the fluid. In one alternative construction, the intermediate chamber 310 has a length greater than its height. The sidewalls 311 of the intermediate chamber 310 may taper inwardly in the direction from bottom to top. That is, the length (L1) of the bottom portion is greater than the length (L2) of the top portion of the chamber 310. Hence, the ratio of L2/L1 is less than 1.0. In an alternative construction, the intermediate chamber 310 may be considered passage having a progressively larger height to width ratio in a direction towards a fluid flow. The sidewall 311 orientation in the inwardly tapered construction provides for a velocity enhancement of the fluid. Nevertheless, it should be appreciated that the sidewalls 311 could generally perpendicular in other constructions.

With continued reference to FIG. 6, the fluid pathways 312 and 316 are directly connected to the immediate chamber 310 and are oriented perpendicular to the top portion of chamber 310. In other constructions, the fluid pathways 312 and 316 could also be disposed at an acute angle with respect to the top of chamber 310. In one construction shown in FIG. 6, the fluid pathway 312 and 316 has a cylindrical tubular construction. Various sizes diameters or widths are possible and may range from 0.080 inches to 0.187 inches. Nevertheless, other diameters or widths are possible according to the inventive aspects. The length of the fluid pathway 312 and 316 can be varied. The length can range from 0.250 inches to 2.000 inches, for example. Although various other ranges may be possible for the length and width. As can be appreciated, the width of the fluid pathway and/or length can be varied to control the velocity and pressure of the fluid within the housing body 302.

The fluid pathways 314a, 314b are directly connected to and are oriented perpendicular to the fluid pathway 316 and 312, respectively. In other constructions, the fluid pathways 314a and 314b could also be disposed at an acute angle or obtuse angle with respect to fluid pathways 314a, 314b, respectively. In one construction shown in FIG. 6, the fluid pathway 314a and 314b has a cylindrical tubular construction. Various sizes diameters or widths are possible and may range from 0.080 inches to 0.190 inches. Nevertheless, other diameters or widths are possible according to the inventive aspects. The length of the fluid pathway 314a and 314b can be varied. The length can range from 0.060 inches to 0.750 inches, for example. Although various other ranges may be possible for the length and width.

In the construction shown in FIG. 6, the pathways 314a and 314b oriented in a generally perpendicular pattern with respect to pathways 316 and 312; and pathway 306 and chamber 310 are oriented in a generally perpendicular pattern to cause the gas bubbles in the liquid to be broken up into small micro bubbles and prevent bubble coalescence as the fluid impacts the walls of the passages in the housing. While two pathways 314a and 314b may be used, the inventive aspect may be practiced with only a single pathway to release the micro bubbles.

In operation, the pressurized liquid gas mixture enters nozzle orifice 304, through fluid pathway 306. The pressurized liquid gas mixture is accelerated through passage 306, forcing it into intermediate chamber 310. This action begins the process of mixing of the gas and liquid and the breaking up of the gas bubbles into micro bubbles. The process continues as the pressurized liquid and gas mixture travels through passages 312, 316, 314a and 314b. The liquid containing micro bubbles is expelled into the fluid dispensing fitting or plumbing through passages 314a and 314b. Passages 312, 316, 314a and 314b have distal openings for releasing the plurality of micro bubbles downstream of the chamber 310 and fluid passages 306. It is understood that the air-water interaction allows creation of a high pressure micro bubble matrix or micro bubble cloud 400 (See FIG. 1). As can be appreciated, the velocity of the bubbles 400 and iconic nature of the micro bubble sweeps away the impurities and debris from the end-user or surfaces of an object being engaged by the micro bubble matrix. The effective cleaning of the surfaces provides an improved cleaning benefit.

Figure 7:
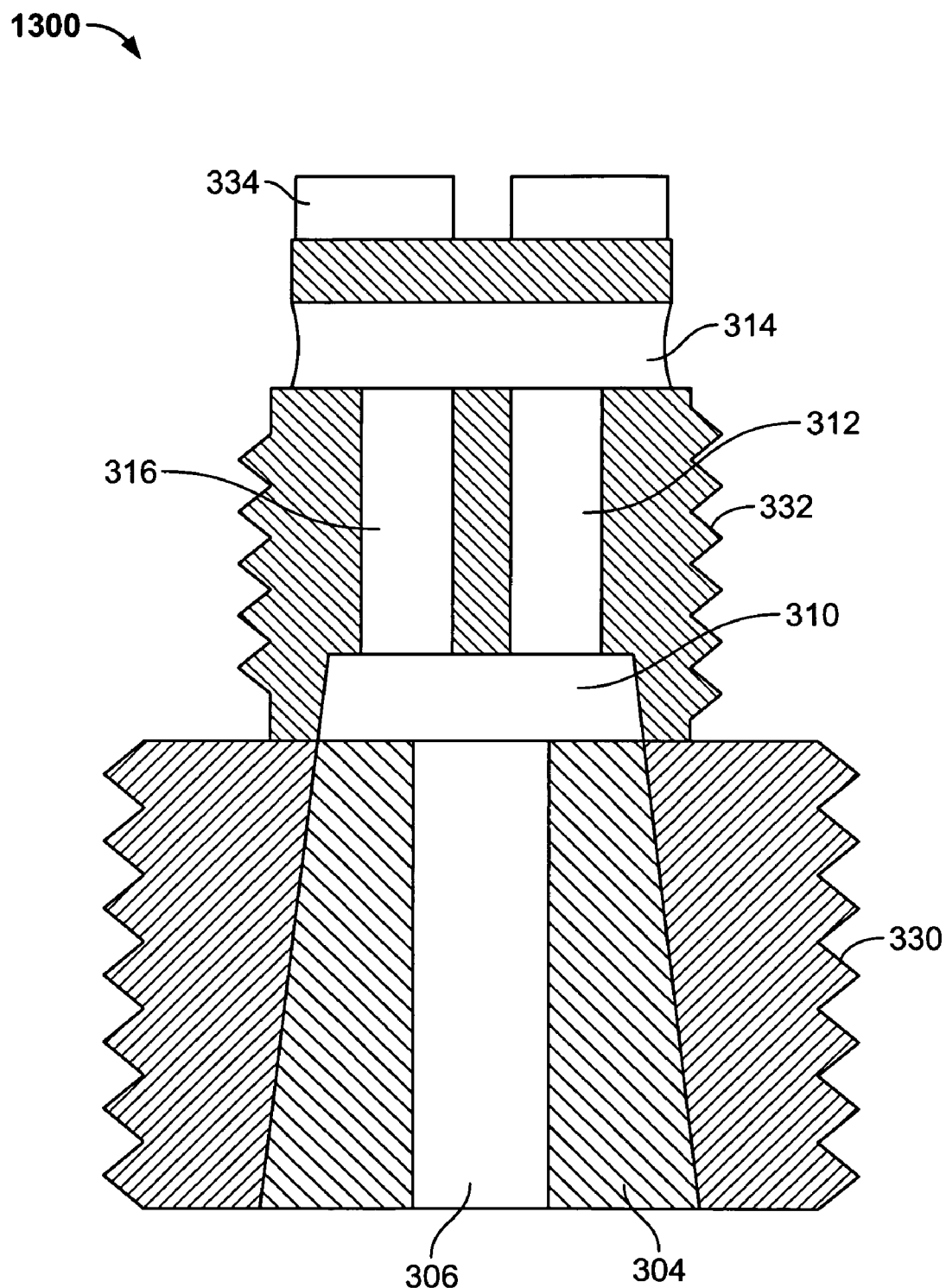
FIG. 7 is a cross-sectional view of an alternative construction of a bubble generating apparatus.

FIG. 7 illustrates an alternative construction of a micro bubble apparatus 1300. Micro bubble apparatus 1300 has a similar construction as micro bubble apparatus 300, except for the construction of a fluid pathway 314. While two pathways 314a and 314b may be used in apparatus 300, the inventive aspect may be practiced with only a single pathway 314 to release the micro bubbles. Pathway 314 is directly connected to and is oriented perpendicular to the fluid pathway 316 and 312.

Figure 8:
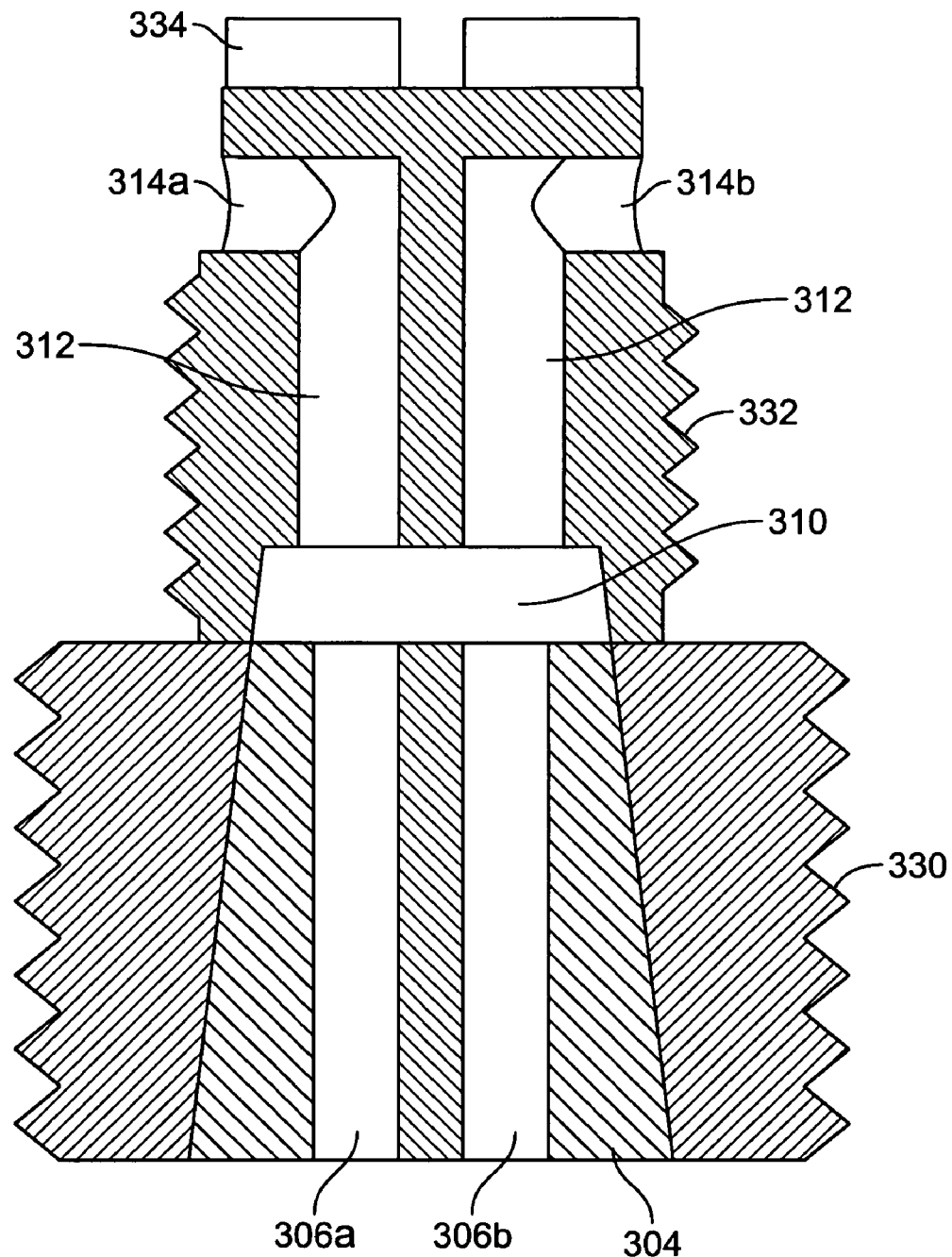
FIG. 8 is a cross-sectional view of an alternative construction of a bubble generating apparatus.

FIG. 8 illustrates yet another alternative construction of a micro bubble apparatus 2300. Micro bubble apparatus 2300 has a similar construction as micro bubble apparatus 300, except for the construction of a fluid pathway 306. While only a single pathway 306 is used in apparatus 300, the inventive aspects may be practiced with two pathways 306a and 306b.

Figure 9:
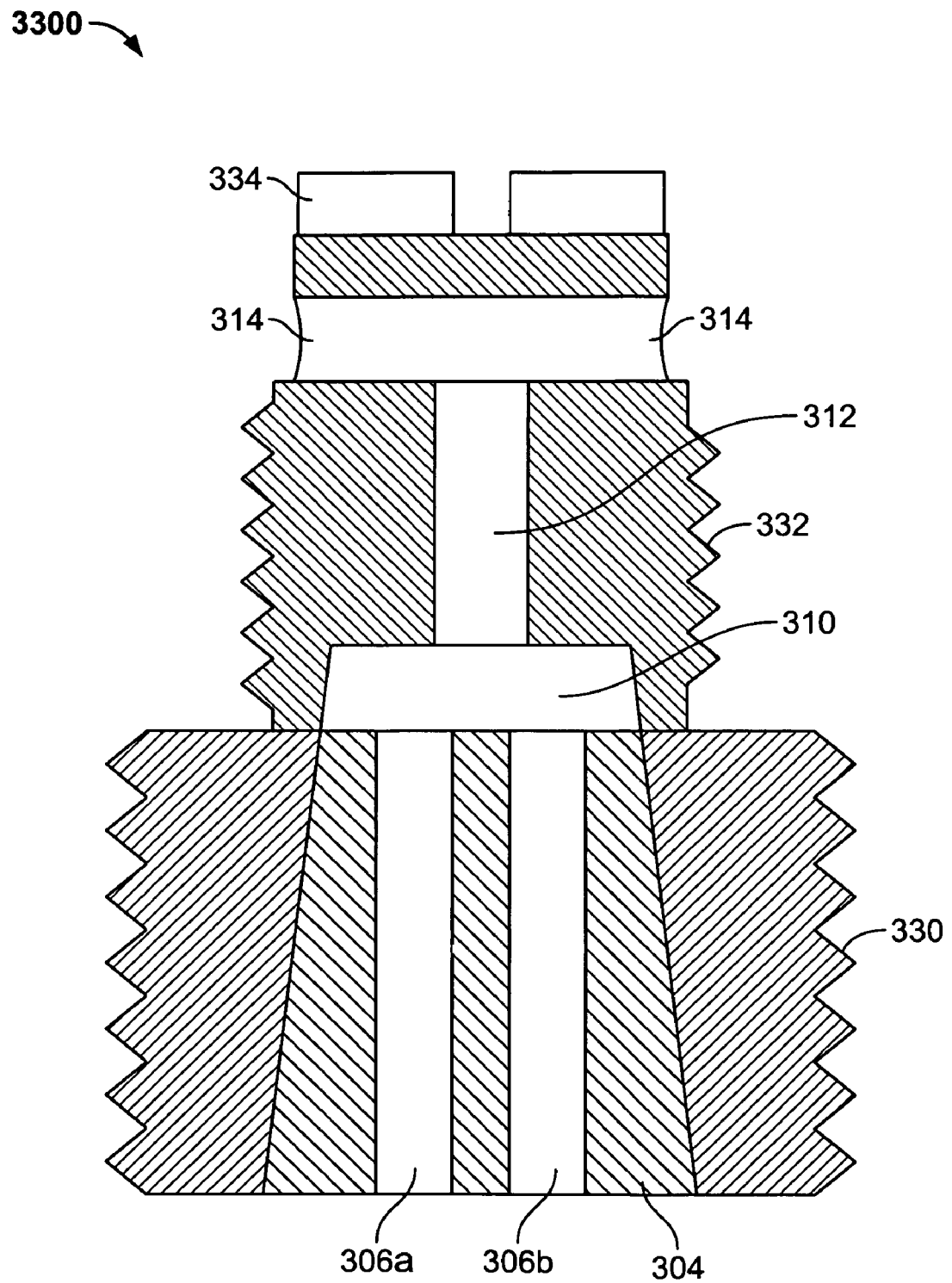
FIG. 9 is a cross-sectional view of an alternative construction of a bubble generating apparatus.

FIG. 9 illustrates yet another alternative construction of a micro bubble apparatus 3300. Micro bubble apparatus 3300 has a similar construction as micro bubble apparatus 300, except for the construction of a fluid pathway 306, 314 and 316. While only a single pathway 306 is used in apparatus 300, the inventive aspects may be practiced with two pathways 306a and 306b. While two pathways 314a and 314b may be used in apparatus 300, the inventive aspects may be practiced with only a single pathway 314 to release the micro bubbles. Furthermore, while two pathways 312 and 316 are provided in apparatus 300, the inventive aspects may be practiced with only a single pathway 312. The angular orientation of the pathways causes the gas bubbles suspended in the liquid to crash into the internal walls of the pathways before expelling the liquid and gas mixture into a liquid dispensing fitting, such as a jet, or dispensing plumbing. The dispensing action promotes a dense and stable micro bubble cloud by breaking the gas bubbles into smaller micro bubbles and preventing the bubbles from coalescing.

As shown in FIGS. 6-9, the inventive aspects may be practices with assemblies of different types of housings configurations and different types of orifice nozzles. It is recognized that individual features and sub-combinations of these features can be used to obtain some of the aforementioned advantages without the necessity to adopt all of these features.

In alternative constructions using the inventive concepts herein, the micro bubble generating apparatus 300, 1300, 2300 and 3300 can be embodied in a form of a replaceable internal cartridge assembly. The cartridge forms a micro bubble cloud as the pressurized liquid and gas mixture passes through it into a bath well, for example. The micro bubble cartridge assembly can be installed into fitting that is used for directing the flow of fluids such as hydrotherapy jets, shower heads, or liquid/water nozzles. Each fitting may contain a cartridge comprising an inlet and outlet orifice and passages that create the micro bubbles. Referring to FIGS. 10 through 13, the bubble generating apparatus 300, 1300, 2300, and 3300 may be provided with various fluid dispensing fittings such as a hydrotherapy jet assembly 500, hand held shower assembly 600, shower head assembly 700, and water nozzle assembly 800.

Figure 10:
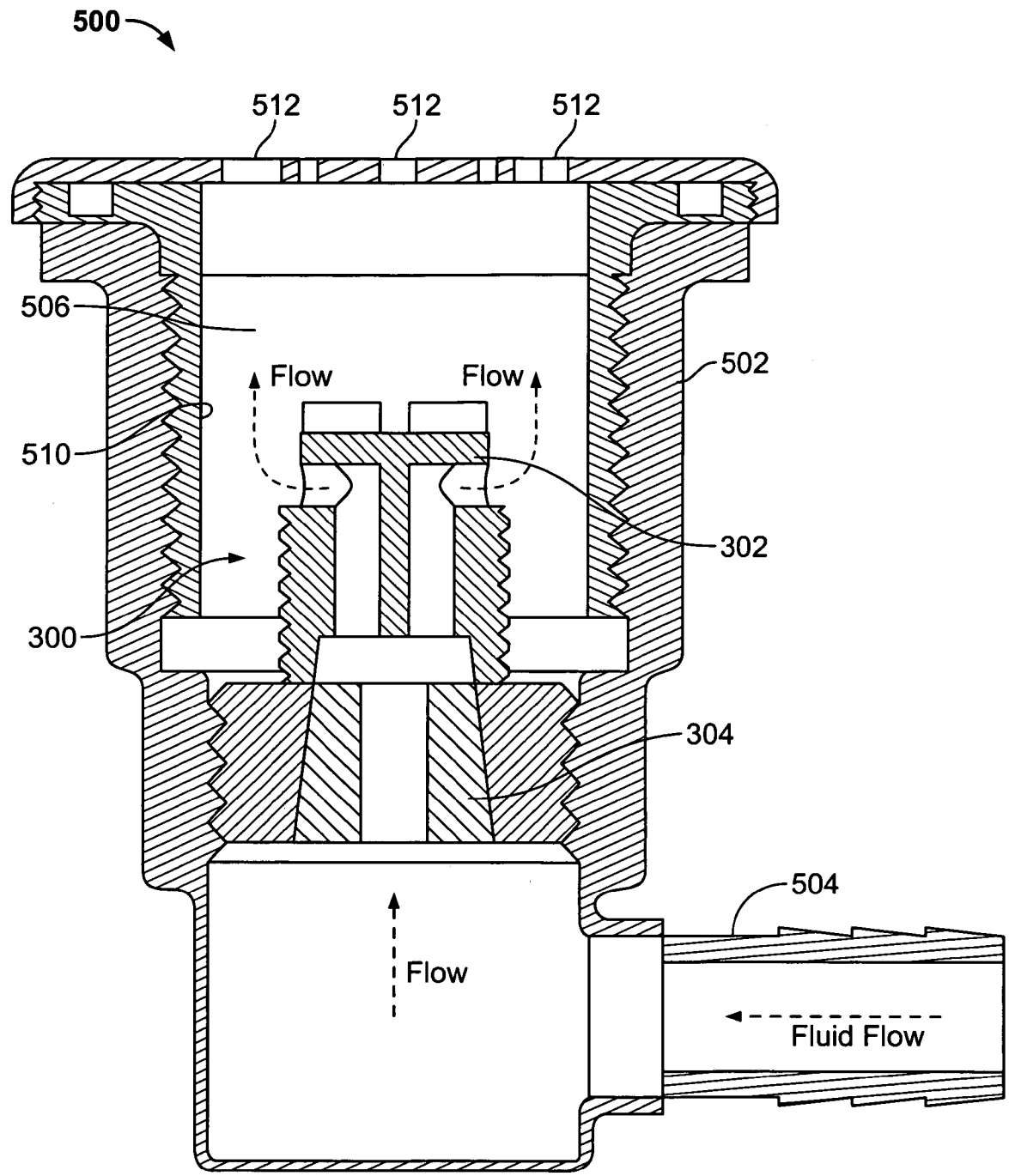
FIG. 10 is a cross-sectional view of a hydrotherapy jet construction for generating micro bubbles.

In the alternative construction shown in FIG. 10, the hydro therapy jet assembly 500 includes a housing body 502 that matingly receives micro bubble generating apparatus 300. It should be appreciated that the micro bubble generating apparatus 300, 1300, 2300 and 3300 can be used in the assembly 500. In the construction shown in FIG. 10, the micro bubble generating apparatus 300 in connected to fluid plumbing line 504. The general direction of fluid flow is schematically indicated in FIG. 10 by the dotted lines. The bubble generating apparatus 300 receives fluid from a pressurized fluid source, such as the saturation/mix tank 118 (See FIGS. 1A and 1B). The micro bubbles exit the pathways of the apparatus 300 into an internal cavity 506 of jet assembly 500 that surrounds an upper portion of apparatus 300 for the outlets. The micro bubbles may crash into the sidewall 510 of the jet 500 to enhance the micro bubble formation action. The micro bubbles exits the internal cavity 506 from dispensing openings or orifices 512. The dispensing action promotes a dense and stable micro bubble cloud by breaking the gas bubbles into smaller micro bubbles and preventing the bubbles from coalescing so that the cloud engages the end-user.

FIG. 11 illustrates a showering implement, such as a hand held shower assembly, generally designated with the reference numeral 600. The hand held shower assembly 600 generally includes a distally disposed head 601 attached to a housing body 602 that matingly receives micro bubble generating apparatus 300. It should be appreciated that the micro bubble generating apparatus 300, 1300, 2300 and 3300 can be used in the assembly 600. The housing body 602 can serve a handle such that it may be generally of an elongated construction dimensioned so that a user can readily grip and manipulate the showering implement 600. The housing body 602 may be formed of many different shapes, lengths and with a variety of constructions. In one construction, the body 602 may have a neck portion positioned adjacent the head 601. The neck portion may be a narrowed region of the housing body 602 between head 601 and the part of the handle body normally gripped by the user. In another construction, the housing body 602 may be integrally formed with the head 601. Other attachment configurations also are possible.

The shower head 601 may include a cleaning region comprising one or more cleaning elements or projections 612. As used herein, the term "cleaning elements" includes a structure that is commonly used or is suitable for use showering cleaning apparatus. In one construction, the one or more cleaning elements are formed from a plurality of bristles.

The general direction of fluid flow is schematically indicated in FIG. 11A by the dotted lines. In the construction shown in FIG. 11A, the micro bubble generating apparatus 300 in connected to fluid plumbing line connect to a pressurized fluid source, such as the saturation/mix tank 118 (See FIGS. 1A and 1B). The micro bubbles exit the pathways of the apparatus 300 into an internal cavity 606 of shower assembly 600 that surrounds an upper portion of apparatus 300 for the outlets. The micro bubbles may crash into the sidewall 610 of the shower assembly 600 to enhance the micro bubble formation action. The micro bubbles exits the internal cavity 606 from dispensing openings or orifices 615. The dispensing action promotes a dense and stable micro bubble cloud to the end-user. With reference to FIGS. 1A and 1B, the optional micro bubble hand shower can be activated by diverting the flow of fluids or used in combination with the micro bubble jet. The hand shower is used to direct the fluid stream of micro bubbles to a location of the human body during showering. The hand shower is designed with protrusions projecting from the body of the hand shower assembly 600. In an alternative arrangement of a hand shower assembly 600' shown in FIG. 11B, the micro bubbles may be delivered through the protrusion 612 (e.g., bristles) in a construction of the protrusions comprising hollow lumens 617. In this construction 600', the hollow lumens 617 provide fluid communication internal cavity 606 of the hand shower assembly 600'. The assembly 600' is of similar construction to the hand shower assembly 600, except of the hollow lumen. In additionally, the hollow lumen constructions can be provided with assembly 600 to increase the benefits of micro bubble use in the hand shower. The features of the hand shower enhance the cleaning, exfoliating and massaging of the human body while using the hand shower assembly.

Figure 12:
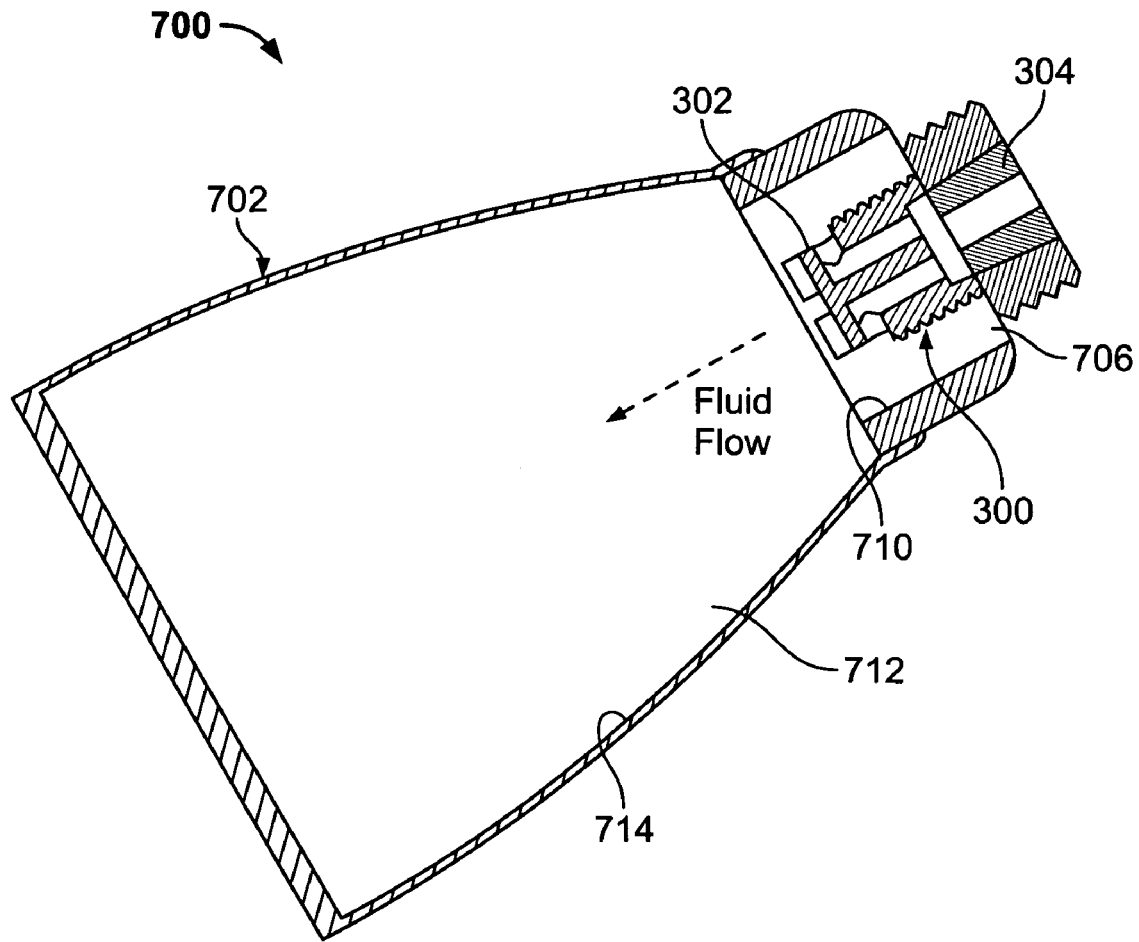
FIG. 12 is a cross-sectional view of a shower head shower construction for generating micro bubbles.

In the construction shown in FIG. 12, the shower head assembly 700 includes a housing body 702 that matingly (e.g., threaded engagement) receives micro bubble generating apparatus 300. It should be appreciated that the micro bubble generating apparatus 300, 1300, 2300 and 3300 can be used in the assembly 700. The general direction of fluid flow is schematically indicated in FIG. 12 by the dotted lines. In the construction shown in FIG. 12, the micro bubble generating apparatus 300 in connected to fluid plumbing line connected to a pressurized fluid source, such as the saturation/mix tank 118 (See FIGS. 1A and 1B). The micro bubbles exit the pathways of the apparatus 300 into an internal cavity 706 of shower head assembly 700 that surrounds an upper portion of apparatus 300 for the outlets. The micro bubbles may hit into the sidewall 710, 714 of the shower head assembly 700 to enhance micro bubble formation. The dispensing action promotes a dense and stable micro bubble cloud to the end-user.

Figure 13:
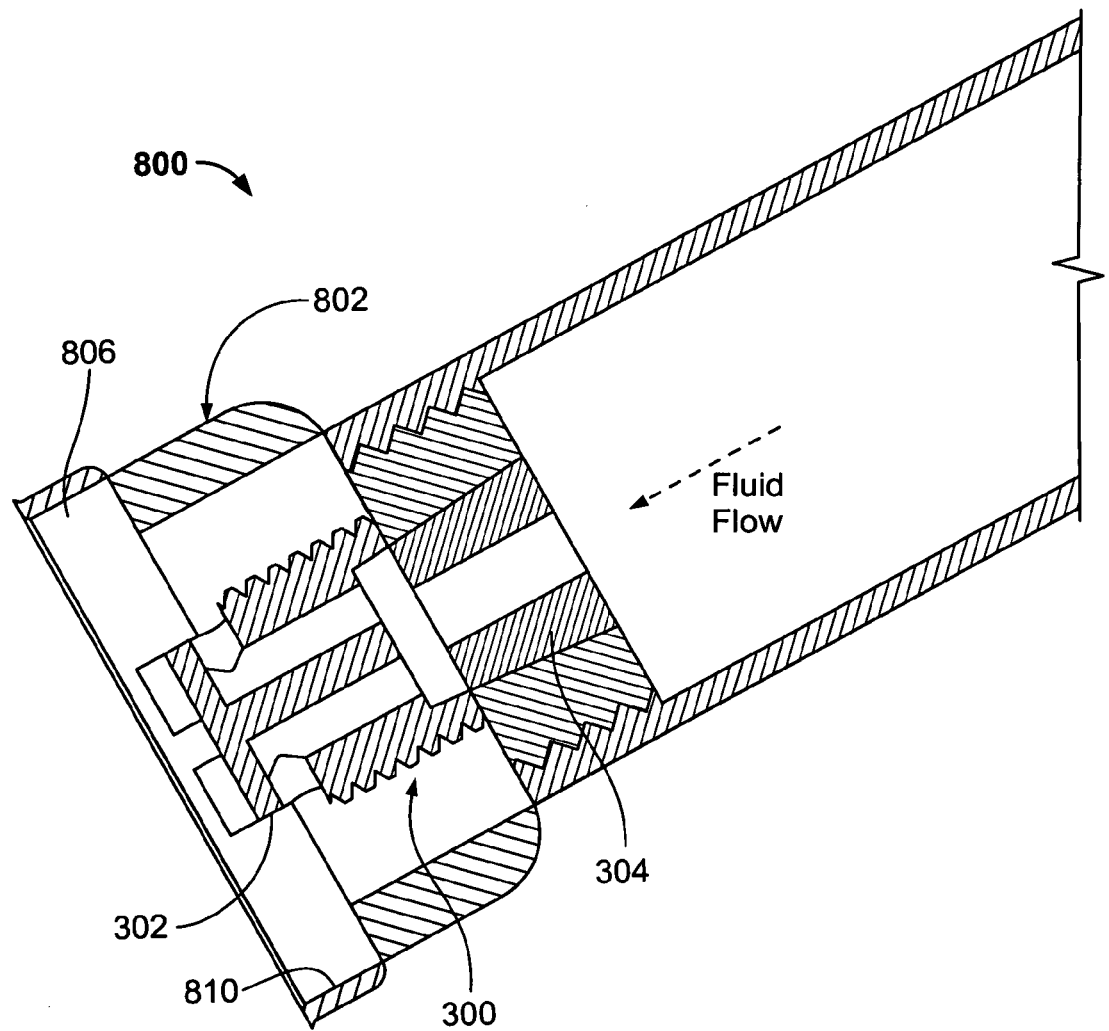
FIG. 13 is a cross-sectional view of a liquid nozzle construction for generating micro bubbles.

In the construction shown in FIG. 13, the water nozzle assembly 800 includes a housing body 802 that matingly (e.g., threaded engagement) receives micro bubble generating apparatus 300. It should be appreciated that the micro bubble generating apparatus 300, 1300, 2300 and 3300 can be used in the assembly 800. In the construction shown in FIG. 13, the micro bubble generating apparatus 300 in connected to fluid plumbing line connected to a pressurized fluid source, such as the saturation/mix tank 118. The micro bubbles exit the pathways of the apparatus 300 into an internal cavity 806 of water nozzle assembly 800 that surrounds an upper portion of apparatus 300 for the outlets. The micro bubbles may hit into the sidewall 810 of the nozzle assembly 800 to enhance micro bubble formation. The dispensing action promotes a dense and stable micro bubble cloud to the end-user.

Figure 14:
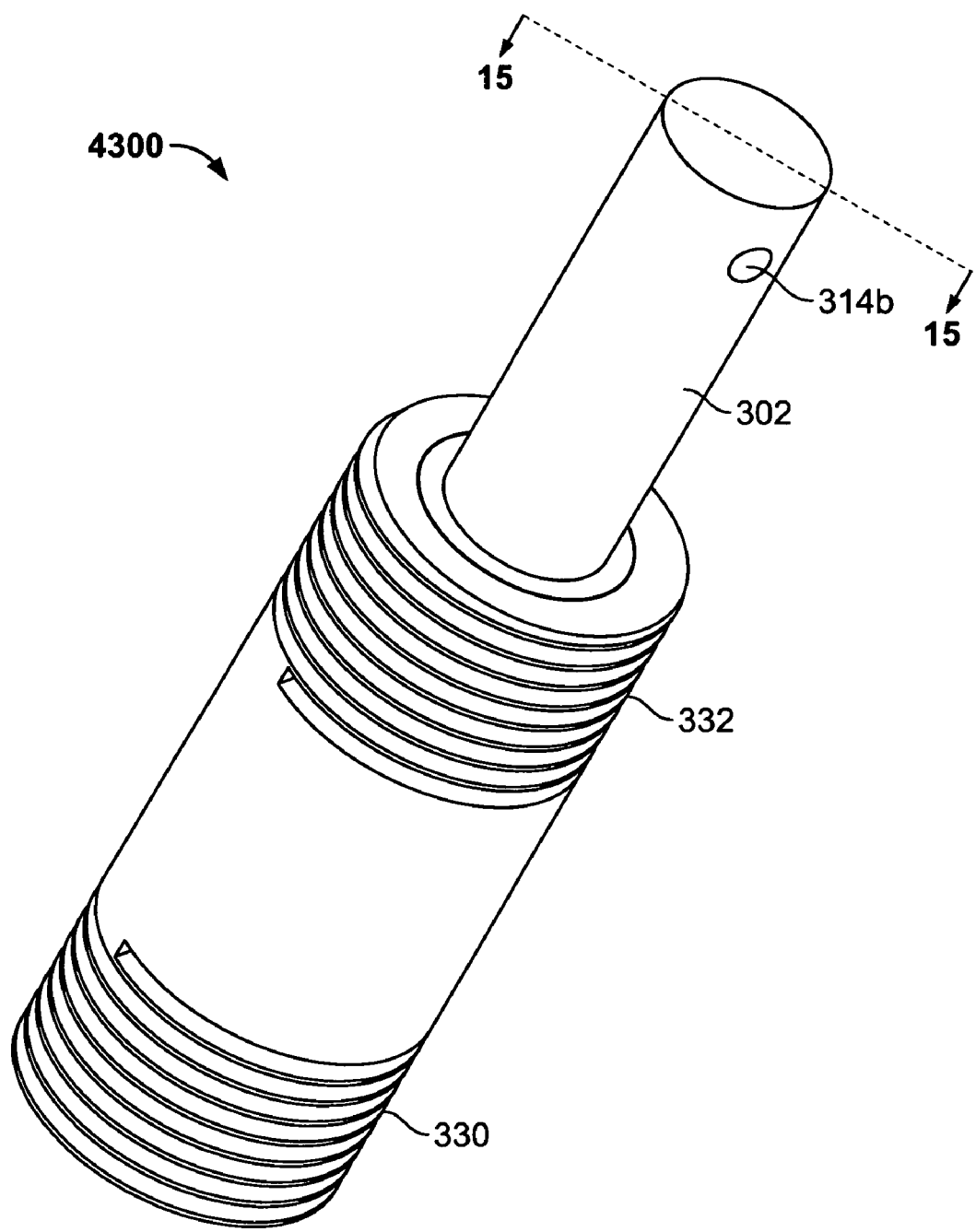
FIG. 14 is a perspective schematic view of an alternative bubble generating apparatus.
Figure 15:
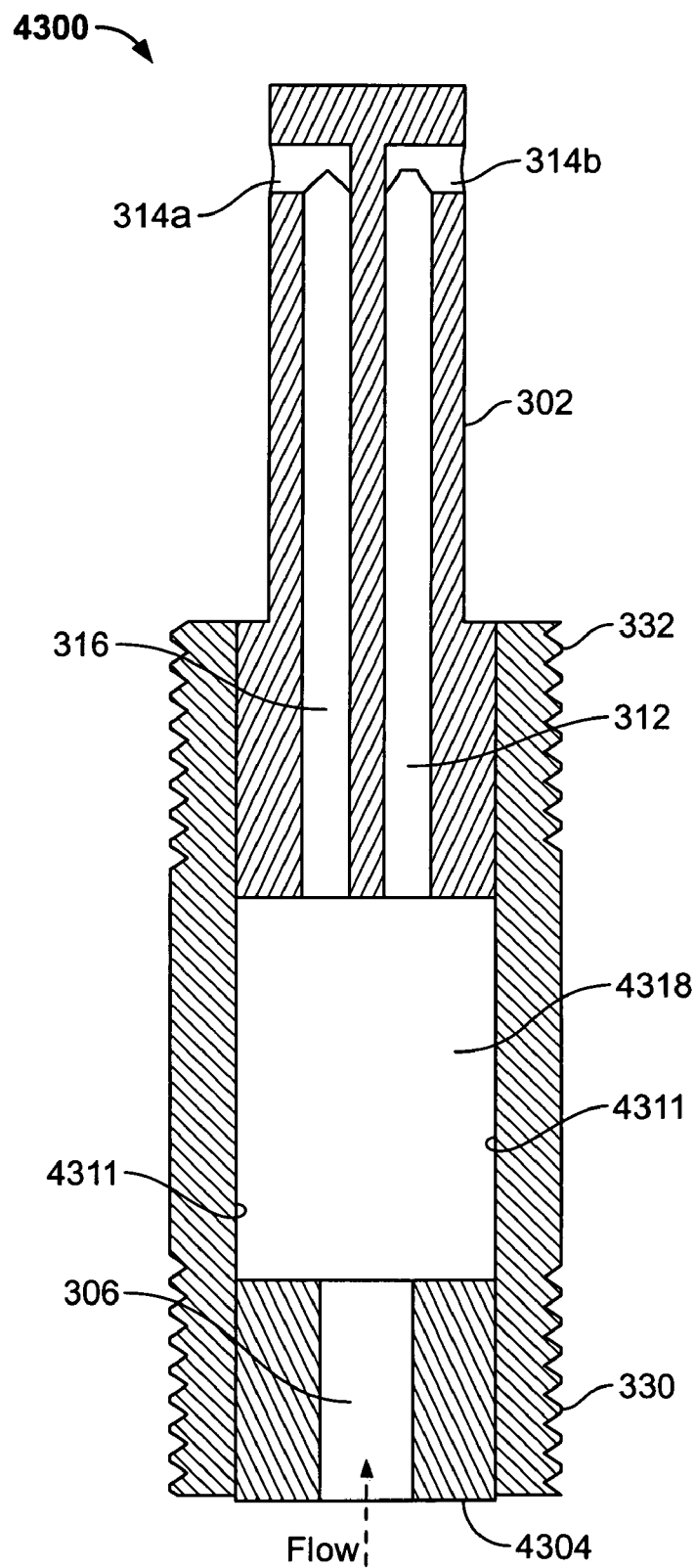
FIG. 15 is a cross-sectional view of the alternative bubble generating apparatus shown in FIG. 14 taken along line 15-15.

FIGS. 14 and 15 illustrate an alternative construction of a micro bubble apparatus 4300. Micro bubble apparatus 4300 has a similar construction as micro bubble apparatus 300, except for example, the construction of intermediate chamber 4318. Chamber 4318 has a generally straight wall arrangement (sidewall 4311), instead of an inwardly inclined sidewall configuration of chamber 318 of apparatus 300. Orifice 4304 has straight wall outer body and performs a similar function as orifice 304. In operation of micro bubble apparatus 4300, the pressurized liquid gas mixture enters nozzle orifice 304, through fluid pathway 306. The pressurized liquid gas mixture is accelerated through passage 306, forcing it into intermediate chamber 4310. This action begins the process of mixing of the gas and liquid and the breaking up of the gas bubbles into micro bubbles. The process continues as the pressurized liquid and gas mixture travels through passages 312, 316, 314a and 314b. The liquid containing micro bubbles is expelled into the fluid dispensing fitting or plumbing through passages 314a and 314b. Referring to FIGS. 10 through 13, the bubble generating apparatus 4300 may be provided with various fluid dispensing fittings such as a hydrotherapy jet assembly 500, hand held shower assembly 600, shower head assembly 700, and water nozzle assembly 800.

Figure 16:
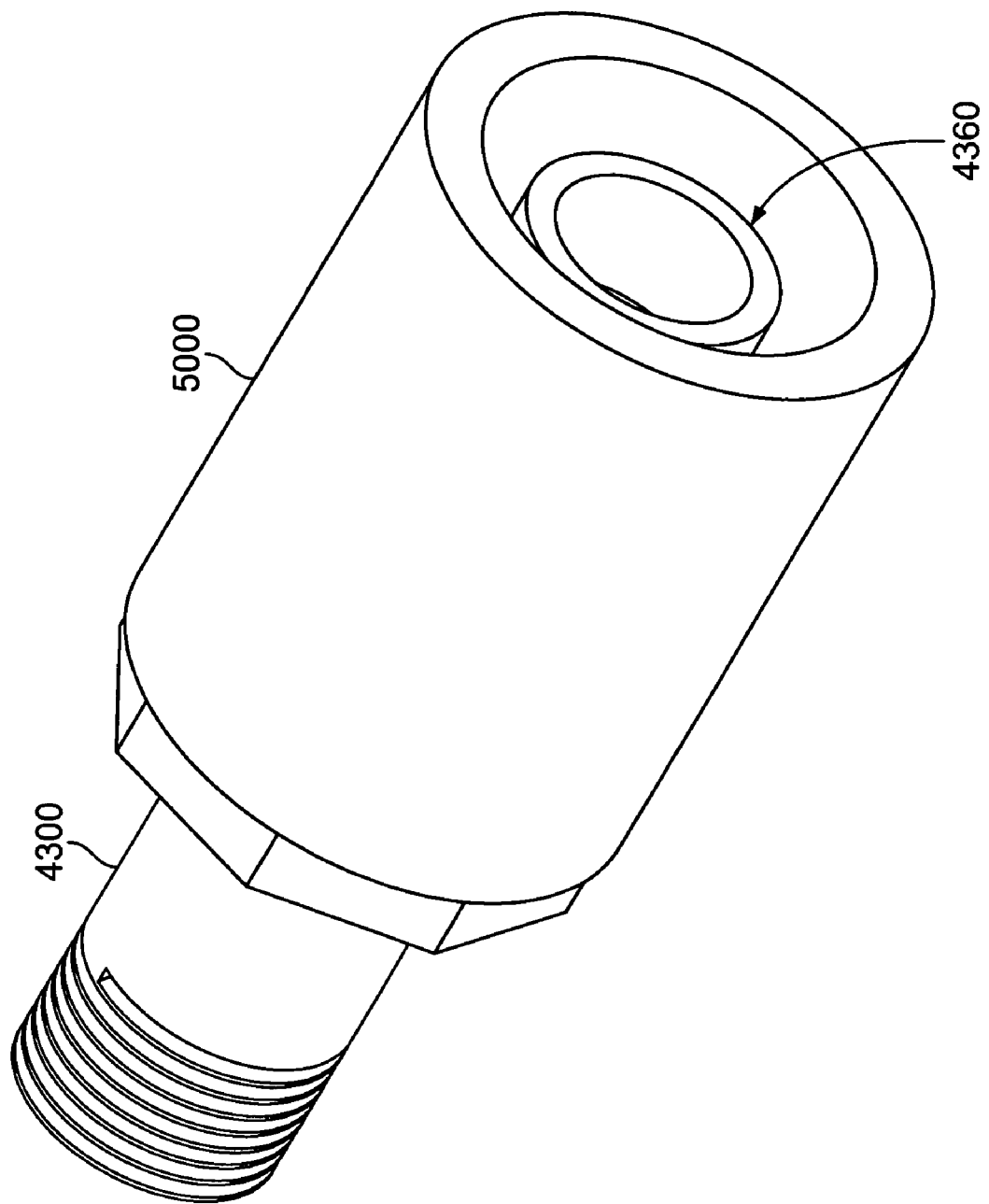
FIG. 16 is a perspective schematic view of an assembly of the alternative bubble generating apparatus shown in FIG. 14 with plumbing fitting.
Figure 17:
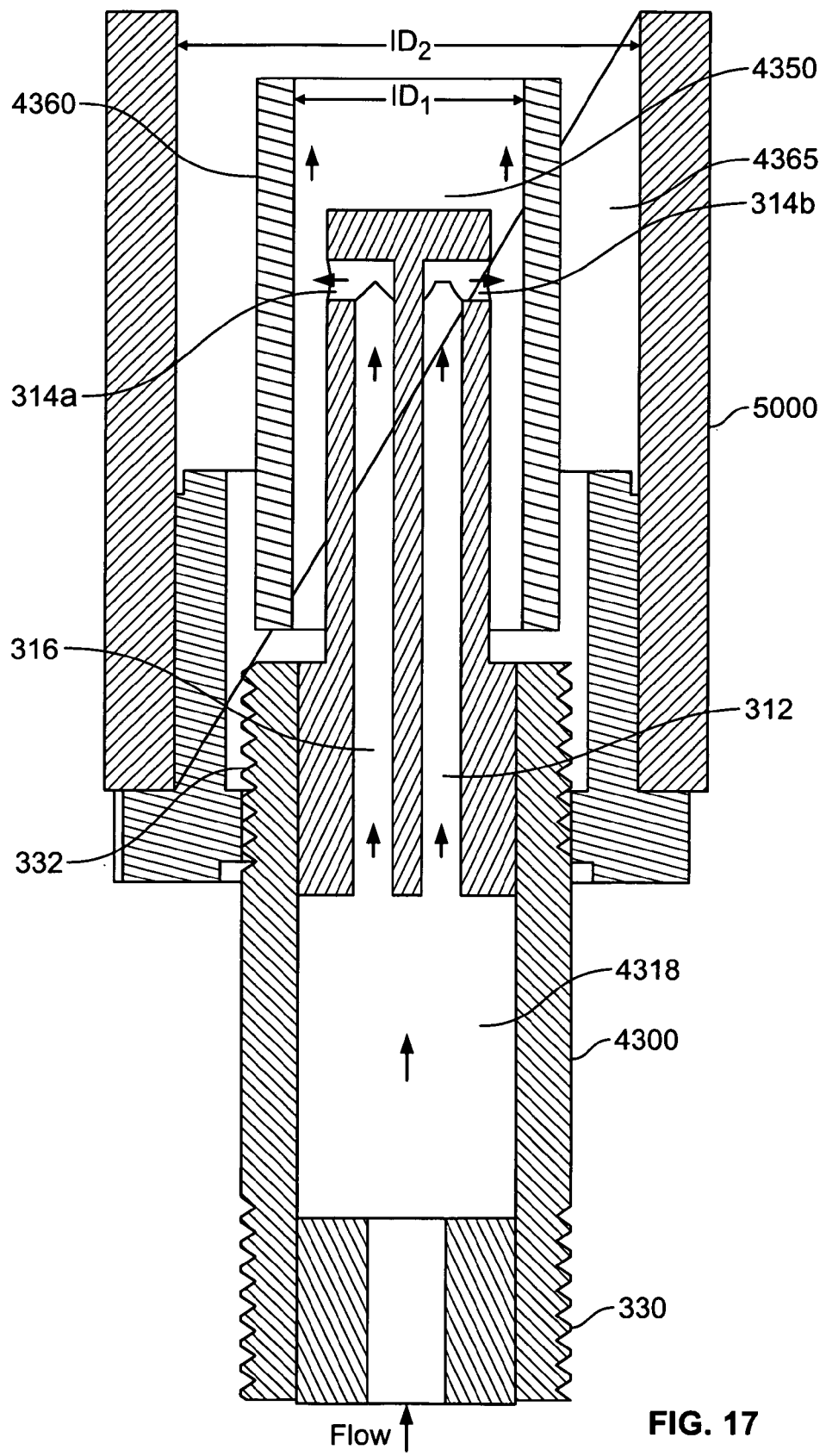
FIG. 17 is a cross-sectional view of the arrangement shown in FIG. 16 to show the assembly arrangement.

FIG. 16 an assembly of the alternative bubble generating apparatus 4300 with plumbing fitting assembly 5000 which can be multiple fittings fastened together and FIG. 17 is a cross-sectional view of the arrangement shown in FIG. 16. The bubble generating apparatus 4300 is provided with a cartridge sleeve 4360, which is a section of ridged pipe or similar component, positioned to allow for the insertion of the micro bubble cartridge 4300 to create a separate liquid/water chamber 4350 around the micro bubble cartridge's discharge pathway 314a, 314b. The inside dimension (ID1) of the cartridge sleeve 4360 provides for a 0.060 inch to 0.750 inch separation between it and the outside diameter of the cartridge 4300. This creates the water chamber 4300 that will fill within a few seconds with liquid, such as water. This action assists the cartridge's discharge pathway 314a, 314b to be submerged in the liquid and micro bubble gas mixture faster than the larger discharge plumbing will allow.

The air bubble chamber 4365 provides a space measuring between the outside dimension of the cartridge sleeve and the inside diameter dimension (ID2) of the plumbing fitting 5000 of 0.060 inches to 0.750 inches for the air that is entrapped in the discharge plumbing during the filling of the bath 200 and before the installed micro bubble system is activated. The chamber 4365 may be located at the highest point in the plumbing and creates a separation between the cartridge's discharge pathways and the entrapped air. This will allow for a fast submergence of the pathways once the system is activated to help provide a micro bubble cloud.

The cartridge 4300 is elevated from the jet that is attached to the shell of the bath or other liquid containing vessel to allow for proper drainage of the saturation/mix tank and discharge plumbing. This promotes the air bubble(s) that are trapped in the discharge plumbing during the filling of the liquid vessel to surround the cartridge's micro bubble discharge pathway preventing the formation of a dense micro bubble cloud. Another purpose for the cartridge sleeve 4360 is to provide a separation from the air bubble(s) trapped in the discharge plumbing and the micro bubble discharge pathway 314a, 314b. This feature advantageously assists in the submergence of the micro bubble pathway in the liquid (e.g., water) and micro bubble gas mixture causing a dense micro bubble cloud to form. The sleeve arrangement advantageously enables the saturated gas in the liquid to transfer immediately into the second liquid in the discharge plumbing to improve the micro bubble cloud creation. Hence, the cartridge sleeve was developed to provide improved performance. It should be note that micro bubble generating apparatus 300, 1300, 2300, and 3300 can be interchangeable used with the cartridge sleeve arrangement.

Alternative Micro Bubble Environments

In one or more aspects, soaking, air bath, whirlpool, and air whirlpool hydrotherapy apparatus with micro bubbles technology herein provides synergist benefits. When used in combination with the typical air bath, whirlpool bath and air whirlpool bath the micro bubble hydrotherapy will improve those hydrotherapy methods by synergistically improving the stimulation of the epidermal layer of a human body in contact with the fluid and temperature receptors to promote greater relaxation. In addition, enhance the decrease in muscle tension, and help increase circulation and open pores to help release unhealthy toxins. It will improve the cleaning of the skin by surrounding the body with negatively charged bubbles so small that they can enter the pores of the skin and remove the dirt and impurities. Micro bubbles can oxygenate and soften the skin by increasing the dissolved oxygen levels in the water; kill bacteria with its negative ions; or reduce or eliminate the need for soaps and chemicals in the bath.

Figure 18:
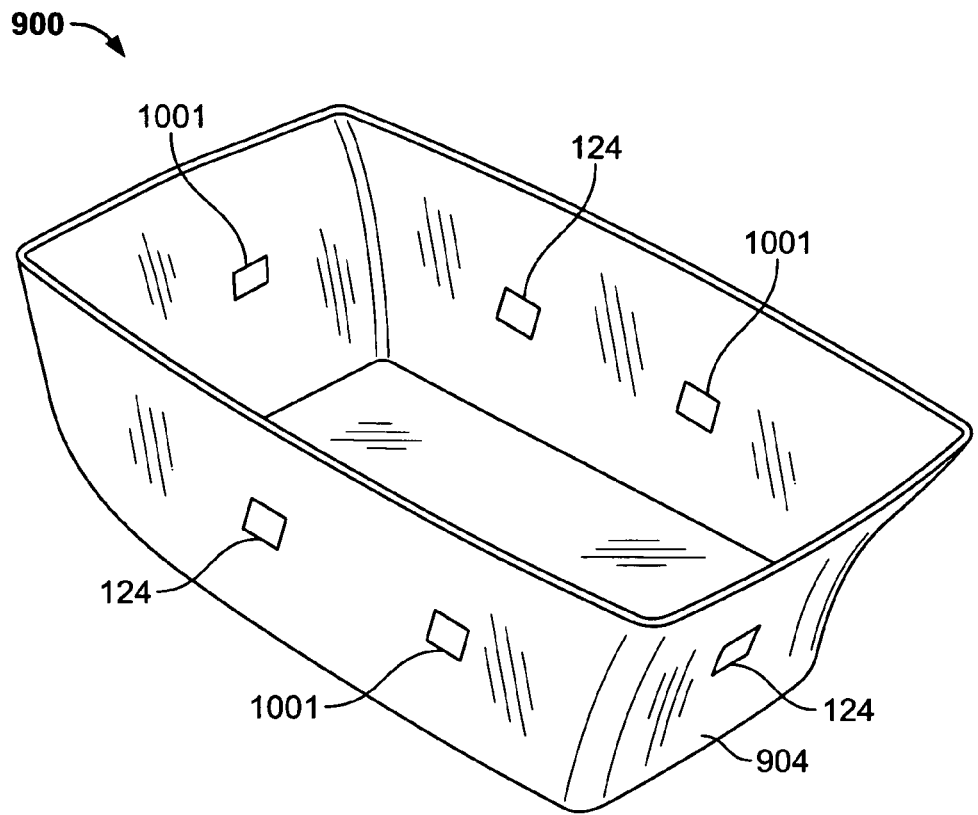
FIG. 18 is a schematic diagram of a bathtub construction for providing chromatherapy with micro bubbles.
Figure 19:
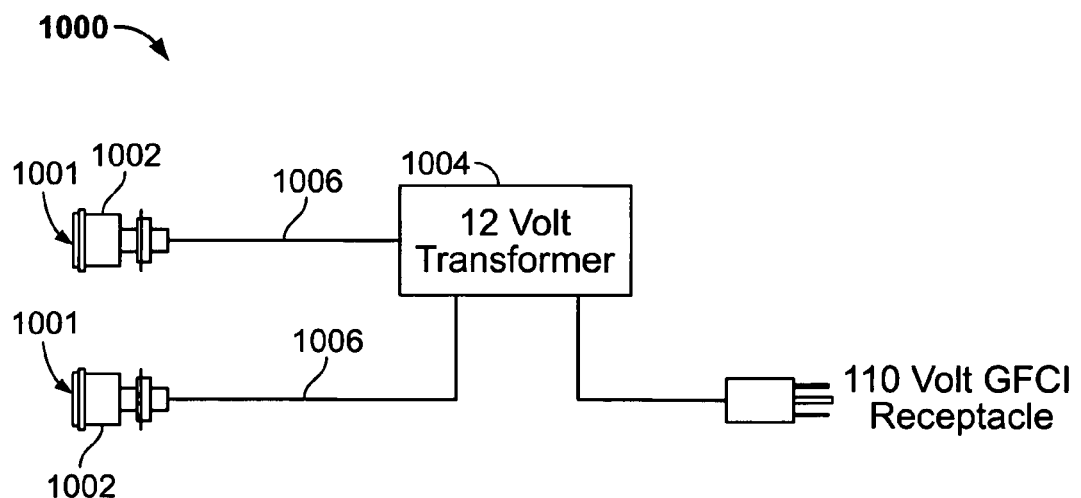
FIG. 19 is a block diagram of a light system construction that can be used for chromatherapy.

In an alternative bathtub construction shown in FIGS. 18 and 19, one or more light sources 1001 may be attached through the shell 904 of a bathtub 900. A single or a plurality of micro bubble jets 124 may be attached to the shell 902 of the bathtub 900 through a hole or opening in the sidewall or bottom of the shell 904. The micro bubble jets 124 are fixedly attached to the bath shell 902. In this way, the illumination of the light sources after the bath well is filled with a micro bubble cloud that provides for refractive enhancement of light. The micro bubble cloud enhances chromatherapy in different types of hydrotherapy baths. Colored lights are used to affect your mood. Micro bubbles can enhance this practice because the dense concentration of bubbles helps increases the lights visibility. In one aspect, the watercolor becomes more dramatic and exciting to the end-user. The light sources 1001 are provided by way of the light system 1000. As will be discussed in the foregoing, the lighting system 1000 may include a variety of light sources 1001 to produce the desired lighting for chromatherapy of the end-user. In one construction, the light source is in the form of Light Emitting Diodes (LEDs).

In one construction, the light housing unit 1002 may include a plurality of individual LED bulbs. The number of LED bulbs can be up to 50, but other values are possible in which the quantity may depend on the light output of the LEDs and desired intensity. The LED bulbs provide for an environmental friendly construction which reduces energy consumption and operating costs of the bathtub system 100. In a further advantage, the LED bulbs provide a relatively long operating life verses incandescent bulbs. Referring to FIG. 19, the light housing units 1002 are electrically connected a transformer system 1004 via wiring 1006. In one case, the transformer system 1004 is a step-down type so that 110 volts and stepped-down to 12 volts.

Figure 20:
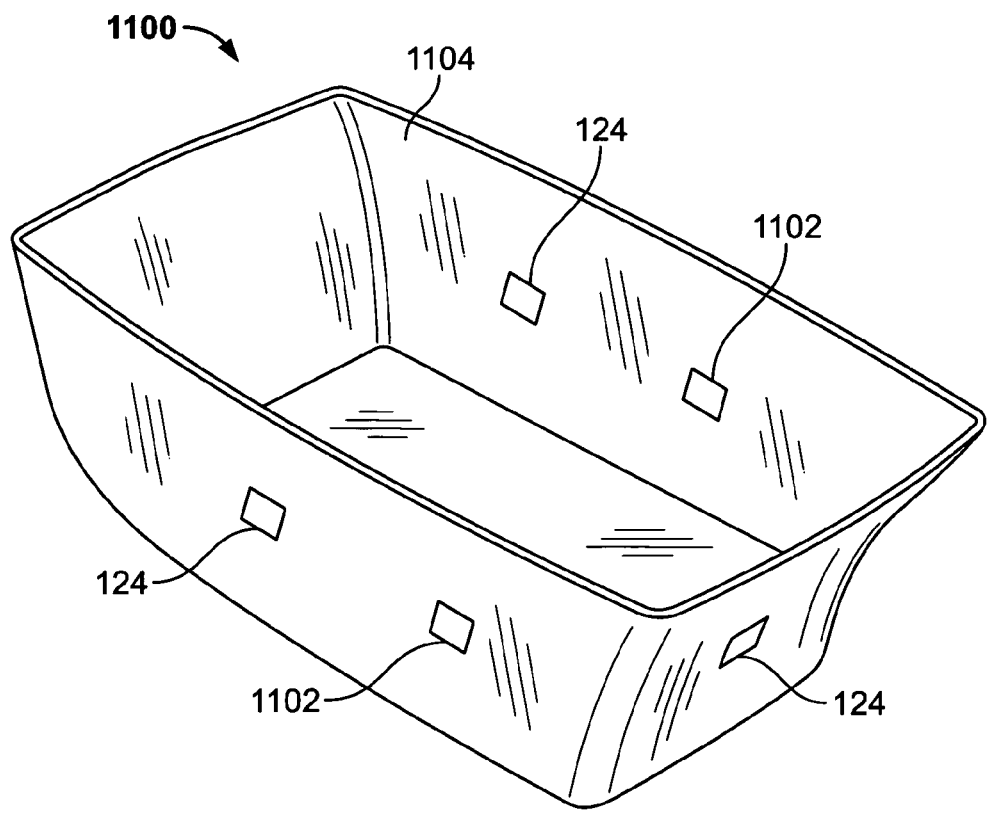
FIG. 20 is a schematic diagram of an alternative bathtub construction for providing hydrotherapy with micro bubbles and air jets.
Figure 22:
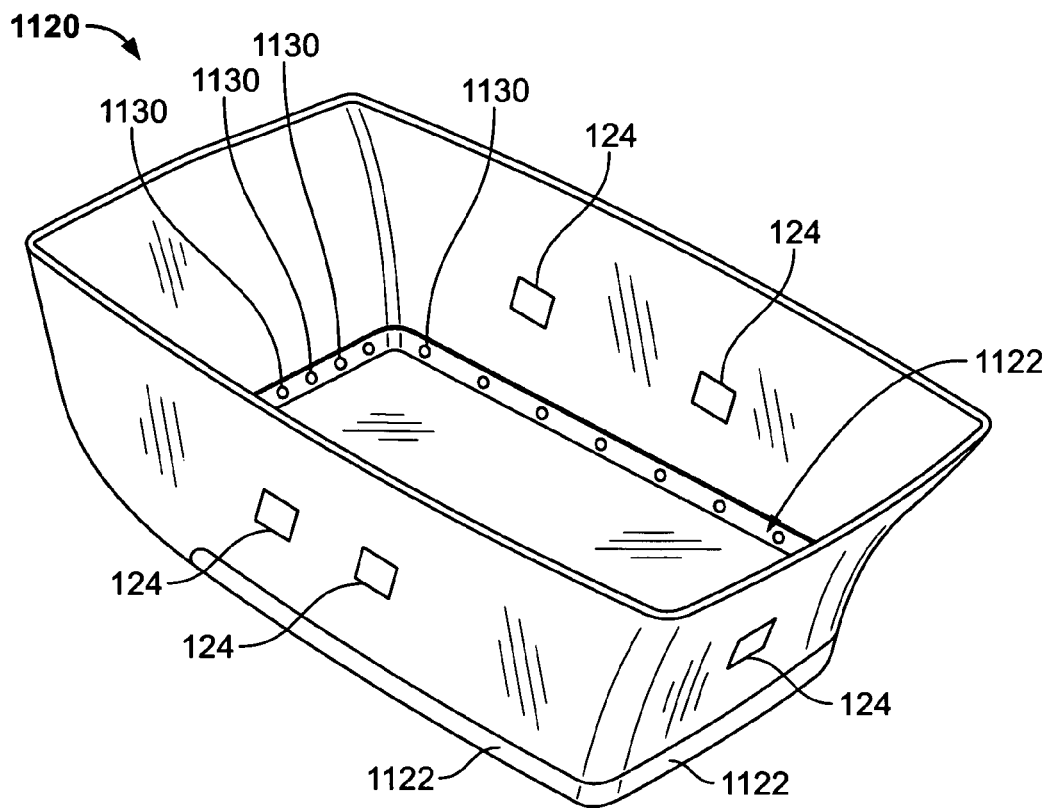
FIG. 22 is a schematic diagram of an alternative bathtub construction for providing hydrotherapy with micro bubbles and air jets/opening with an air channel arrangement.

In an alternative bathtub construction 1100 shown in FIG. 20, one or more air jets 1102 may be attached through the shell 1104 of a bathtub 1100. A single or a plurality of micro bubble jets 124 may be attached to the shell 1104 of the bathtub 1100 through a hole or opening in the sidewall or bottom of the shell 1104. In the alternative bathtub construction 1120 shown in FIG. 22, an air channel 1122 may direct jets of air into the bathtub well. The air channel 1122 has hollow tubular constructions with a plurality of openings 1130 (or jets) for releasing pressurized ambient air into the bath well. Air bubbles stimulate the skins light touch receptors located in the subcutaneous tissue region producing an overall calming effect. When micro bubbles were tested with this air jet hydrotherapy, the stimulation of the light touch receptors was increased (Level 2 stimulation in FIG. 26). This simulation of the receptors is believe to be achieved by the increased number of bubbles available to contact the skin, approximately 3000% more bubbles than the air jets produced alone. The characteristics of the micro bubble to be suspended longer in the water and to be attracted to positively charged surfaces like human skin as explained in Van der Waals forces also is believed to contribute to the increased stimulation of the light touch receptors. In particular, the overall effect of the air bath can be improved by adding the micro bubble hydrotherapy by eliminating at one least of the issues now associated with air baths.

The first problem with conventional air baths is that the concentration of air bubbles in the water and the total area the bubbles occupy in the well of the bath is not fully utilized. This effect is due to the location of the air jets and the characteristics of the larger bubble of approximately 0.060 inches to 0.125 inches in diameter. These bubbles produce low concentration levels because of the bubble size and the bubble only stays suspended in the water for a few seconds before floating to the water surface and bursting in addition the bath well is not completely filled with bubbles because the air jets do not sufficiently project the air into the bath well. This is because there is not enough air pressure produced by the air turbines of the conventional air bath. This means that the air is only projected a very short distance, approximately less than 1.000 inch, from each air jet. The result is large bubbles that only have partial contact with the bather's skin. The use of micro bubbles can improve this limitation of conventional air baths by creating a dense concentration of small bubbles. These micro bubbles will stay suspended in the water longer than conventional air bath bubbles. Thus, this actions allows the micro sized bubbles to surround and cover the body parts of the bather that are submerged in the bathing well.

The second issue is that conventional air baths water temperature cools down faster than other types of hydrotherapy. This is because of the turbulence created at the water surface as the large air bubbles burst. This effect can be minimized when used with micro bubbles because the micro bubble density in the water minimizes the turbulence and the air turbine of the conventional air bath can be set at a lower output speed due to the increase of overall bubble concentration created by the micro bubbles.

The third issue is that the turbulence and the large bubbles bursting at the water surface can cause a problem for the bather because it becomes annoying to have water sprayed in your face during use. The water has a tendency to project out of the bath causing water to accumulate on the floor and around the bath. Since the micro bubbles do not burst at the water surface and the turbulence is decreased these issues are advantageously minimized.

The forth is the phenomenon known as the "cool air effect". This happens when the bath user sits to close to the air jets. A cool sensation that is objectionable to some bathers is caused because the air coming out of the air jets touches the wet skin causing this sensation. The micro bubble will help protect the body by creating a barrier of micro bubbles between the body and the air jet minimizing this effect.

Figure 21:
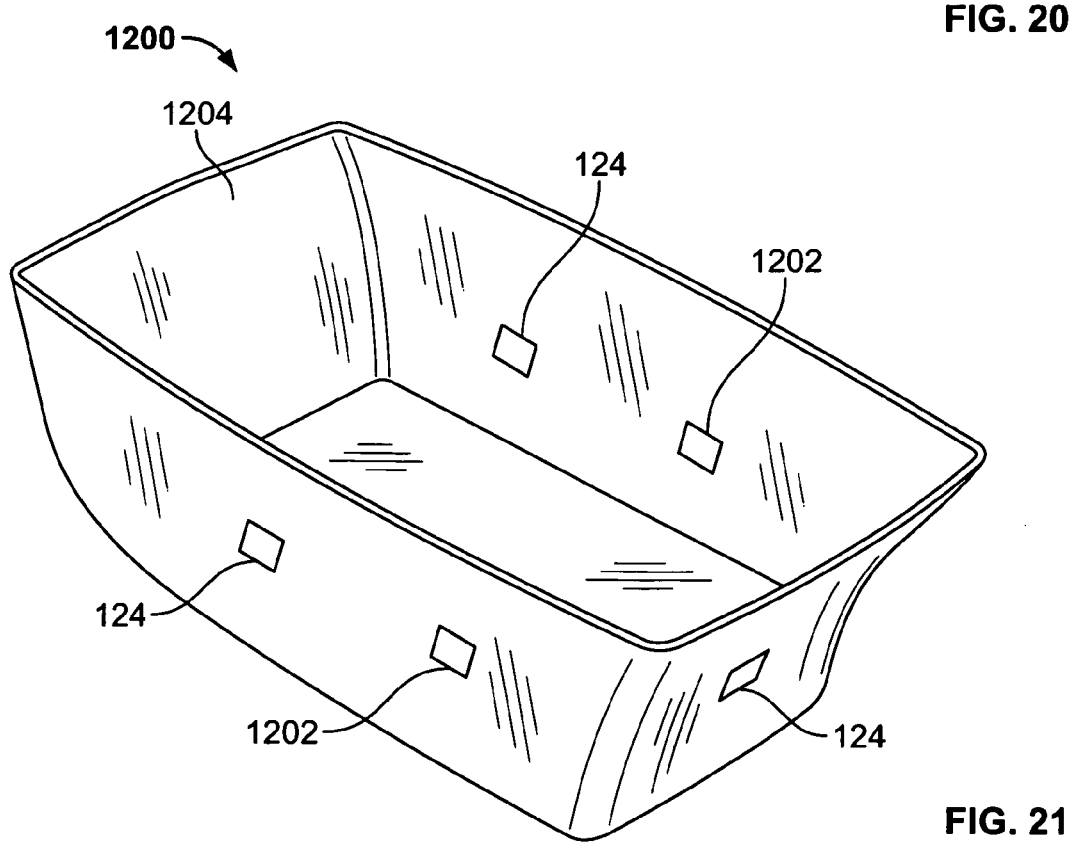
FIG. 21 is a schematic diagram of an alternative bathtub construction for providing hydrotherapy with micro bubbles and a whirlpool jets.

In an alternative bathtub construction shown in FIG. 21, one or more whirlpool jets 1202 may be attached through the shell 1204 of a bathtub 1100. The whirlpool jets 1202 can be a conventional construction of a jet with pressurized water delivered into the bathtub well. A single or a plurality of micro bubble jets 124 may be attached to the shell 1204 of the bathtub 1200 through a hole or opening in the sidewall or bottom of the shell 1104. In this way, a method of producing gas micro bubbles is provided in the same vessel with another type of hydrotherapy system.

Figure 23:
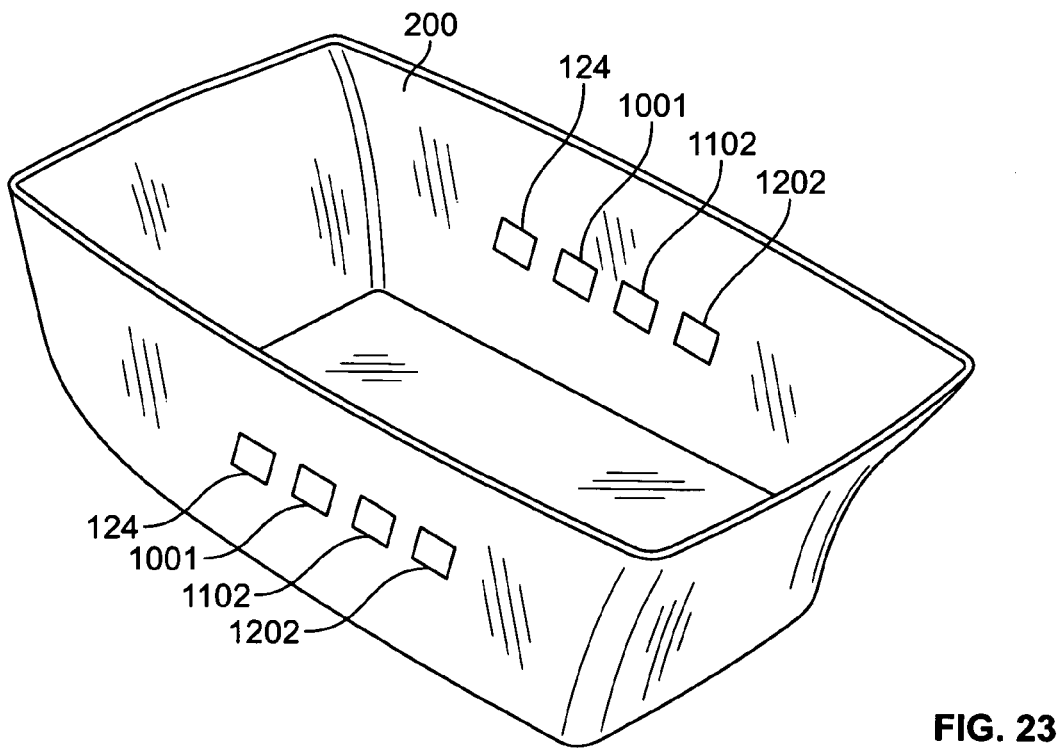
FIG. 23 is a schematic diagram of an alternative bathtub construction for providing hydrotherapy with micro bubbles, a whirlpool jets, and air jets.

In an alternative bathtub construction shown in FIG. 23, one or more light sources 1001, air jets 1102, and whirlpool jets 1202 may be attached through the shell 200 of a bathtub. A single or a plurality of micro bubble jets 124 may be attached to the shell 200 of the bathtub through a hole or opening in the sidewall or bottom of the shell 200. It should be recognized that the air channel 1122 feature shown in FIG. 22 can be used in lieu of air jets 1102. Further, it should be appreciated that the relative positioning of the light sources 1001, air jets 1102, and whirlpool jets 1202 shown in FIGS. 18, 20, 21, 22, 23 is provided for illustrative purposes as the inventive aspects can be practiced in other relative positions. In this way, a method of producing gas micro bubbles is provided in the same vessel with an enhanced hydrotherapy system to simulate human nerve groups of a human body to invoke physiological benefits, such as, for example, producing an intense calm; promoting a high degree of relaxation and stress relief to the user; or improving blood circulation in the skin; or enhanced cleaning of the body via the negative ion effect of the micro bubble cloud, for example. Further, physiological benefits may include Level 1, Level 2 or Level 3 stimulation as previously discussed with respect to FIG. 26.

In alternative constructions, the pump 106, injector 108, saturation and mix tank 118, electronic controls 116 may be attached to a fixed stand or cradle.

Figure 24:
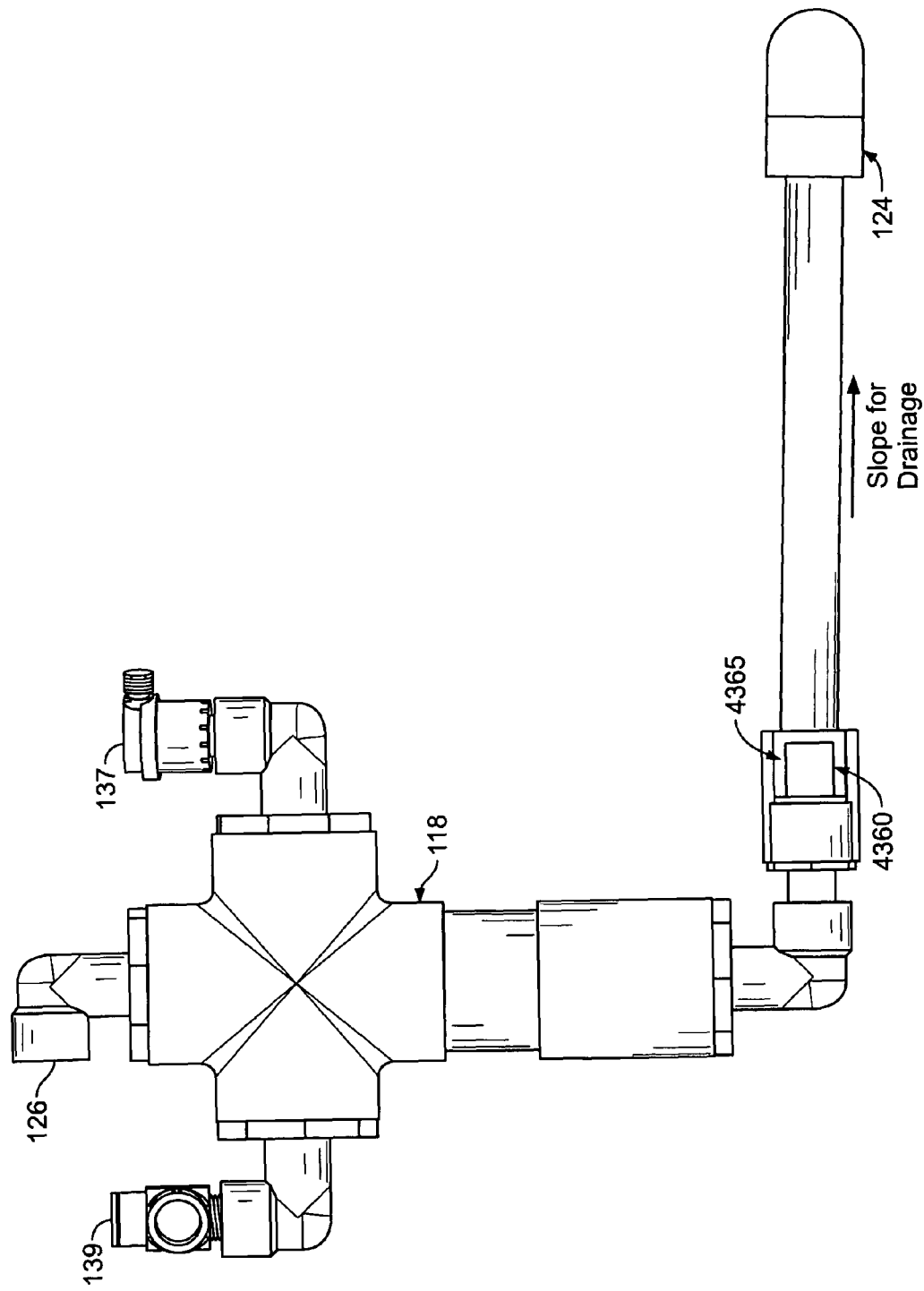
FIG. 24 is a schematic diagram of saturation tank plumbing arrangement for drainage.

FIG. 24 is illustrates a schematic diagram of saturation tank plumbing arrangement for drainage. In the alternative construction, the assembly provides a slope from the intake of the high pressure pump to the suction fitting. The direction of the slope is away from the pump to the suction fitting at an incline that will enable draining of the interconnecting plumbing. In addition, positive incline from the discharge of the saturation/mix tank to the jet 124 enables draining of the discharge interconnecting plumbing. This will assure proper drainage of the system once the bath has completed its operation and it has been drained.

Figure 25:
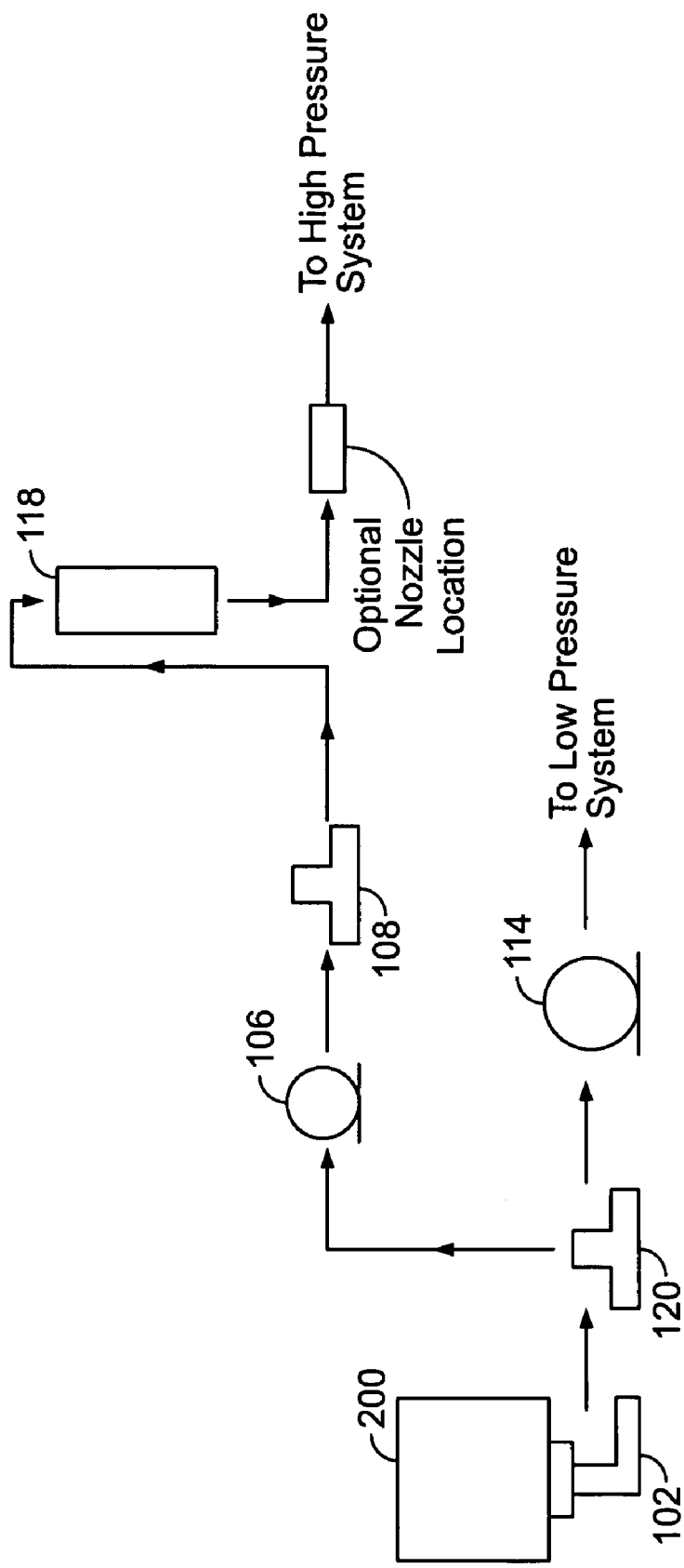
FIG. 25 is a functional block system diagram of an alternative bubble generating system arrangement with a common suction fitting for attaching to a bathtub well.

FIG. 25 is a functional block system diagram of an alternative bubble generating system arrangement with a common suction fitting. In one construction, a common suction fitting 102 is used to supply the hydrotherapy pumps 106 and 114. The liquid is allowed to be drawn into a multiple orifice fitting(s) after being drawn through the suction cover and before it is delivered to the pumping device.

In operation, the previously described features, individually and/or in any combination, improves support and lighting characteristics of a bathtub system. While the various features of bathtub system 100, 101 operate together to achieve the advantages previously described, it is recognized that individual features and sub-combinations of these features can be used to obtain some of the aforementioned advantages without the necessity to adopt all of these features.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. For example, the inventive aspects with micro bubbles herein can be used to clean surfaces or objects disposed pedicure foot baths, laundry sink baths, pet cleaning baths, kitchen sinks, clothes washing machines, dishwashers, showers, spas, pools, aquariums, ponds, or toilets.

It will be apparent to those skilled in the relevant technology, in light of the present specification, that alternate combinations of aspects of the invention, either alone or in combination with one or more elements or steps defined herein, may be utilized as modifications or alterations of the invention or as part of the invention. While specific bathtub configurations have been illustrated, the present invention is not limited to any of the aesthetic aspects shown and, in practice, may differ significantly from the illustrated configurations. It may be intended that the written description of the invention contained herein covers all such modifications and alterations.

The invention claimed is:

1. A method of using micro bubbles, comprising: providing a fluid mixture, including a saturated gas therein, to a fluid chamber having inwardly inclined sidewalls in the direction of fluid flow, the fluid chamber being connected to a fitting; providing the fluid mixture into an intermediate chamber surrounding the fluid chamber; and producing a plurality of micro bubbles into an elongated pipe to a fluid disposed in a vessel.

2. The method according to claim 1, further comprising a step of providing air gas bubbles into the fluid during the step of producing the micro bubbles; wherein the air gas bubbles are larger than the micro bubbles.

3. The method according to claim 1, further comprising a step of providing illumination to the fluid via a light emitting diode device.

4. The method according to claim 1, further comprising a step of providing heat energy to the fluid via a heating source.

5. The method according to claim 1, further comprising the step of using the saturated gas including a scent.

6. The method according to claim 1, further comprising a step of regulating a gas head for saturating the gas.

7. The method according to claim 1, further comprising a step of providing a pressurized stream of the fluid.

8. The method according to claim 1, further comprising a step of providing gas bubbles into the fluid and a pressurized stream of the fluid; wherein the gas bubbles are larger than the micro bubbles.

9. The method according to claim 1, wherein the micro bubbles in the vessel are used for engaging a subcutaneous tissue of a human body.

10. The method according to claim 1, wherein the micro bubbles are mixed in the fluid and drawn to create a second fluid mixture used for cleaning plumbing interconnected with the fitting.

11. The method according to claim 1, further comprising a step of sanitizing of the liquid with ultraviolet light.

\* \* \* \* \*